US008250023B2

(12) United States Patent
McGlinchy et al.

(10) Patent No.: US 8,250,023 B2
(45) Date of Patent: Aug. 21, 2012

(54) WINDOW PROCESSING SYSTEM COMPRISING A CLEANING STATION WITH MULTIPLE CUTTING SURFACES

(75) Inventors: Timothy B. McGlinchy, Twinsburg, OH (US); James B. Williams, II, Seville, OH (US); Robert R. Shepherd, II, Mogadore, OH (US); Brady S. Jacot, Stow, OH (US); David F. Lewis, Jr., Hudson, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 0 days.

(21) Appl. No.: 13/041,501

(22) Filed: Mar. 7, 2011

(65) Prior Publication Data
US 2012/0054972 A1 Mar. 8, 2012

Related U.S. Application Data

(62) Division of application No. 11/865,244, filed on Oct. 1, 2007, now Pat. No. 7,921,064.

(60) Provisional application No. 60/828,782, filed on Oct. 10, 2006.

(51) Int. Cl.
*G06F 15/00* (2006.01)
(52) U.S. Cl. ........................................................ 706/62
(58) Field of Classification Search .................... 706/14, 706/12, 62; 408/69; 15/3; 264/39
See application file for complete search history.

(56) References Cited

U.S. PATENT DOCUMENTS

| | | | |
|---|---|---|---|
| 4,909,892 A | 3/1990 | Quinn et al. | |
| 4,971,639 A | 11/1990 | Quinn et al. | |
| 5,448,819 A * | 9/1995 | Grassi | 29/558 |
| 6,006,408 A * | 12/1999 | Rogat | 29/33 A |
| 6,877,341 B1 * | 4/2005 | Hong | 65/28 |
| 7,073,423 B2 * | 7/2006 | Aquino et al. | 83/582 |
| 7,354,227 B2 | 4/2008 | Ramnauth et al. | |
| 7,784,161 B2 * | 8/2010 | Eisenbach et al. | 29/26 A |
| 2005/0257361 A1 | 11/2005 | Ramnauth et al. | |
| 2006/0101961 A1 | 5/2006 | Etter et al. | |
| 2007/0234550 A1 | 10/2007 | Eisenbach et al. | |

FOREIGN PATENT DOCUMENTS

| | | |
|---|---|---|
| DE | 4018145 | 12/1991 |
| DE | 4018145 A1 | 12/1991 |
| EP | 1125670 | 12/2004 |
| EP | 1125670 B1 | 12/2004 |

OTHER PUBLICATIONS

European Search Report dated Nov. 7, 2008 Corresponding to European Application No. 08004504.0, filed Mar. 11, 2008.

* cited by examiner

*Primary Examiner* — David Vincent
(74) *Attorney, Agent, or Firm* — Tarolli, Sundheim, Covell & Tummino LLP

(57) ABSTRACT

A window processing system is disclosed for fabricating window frames. A welding station has welding heads to weld or fuse vinyl frame parts together. The frames are taken to a cleaning station having a number of cleaning heads that are independently actuated to move into a position relative selected portions of the window frame to clean off burrs, weld beads etc from the welded window frame. The cleaning process involves both training of a controller to recognize certain frame profiles and a compensation process for adjusting the cleaning process for individual variations in the frame that occur during fabrication. Real-time cleaning involves coupling a visual sensor to a moving support that also supports a cleaning tool.

3 Claims, 22 Drawing Sheets

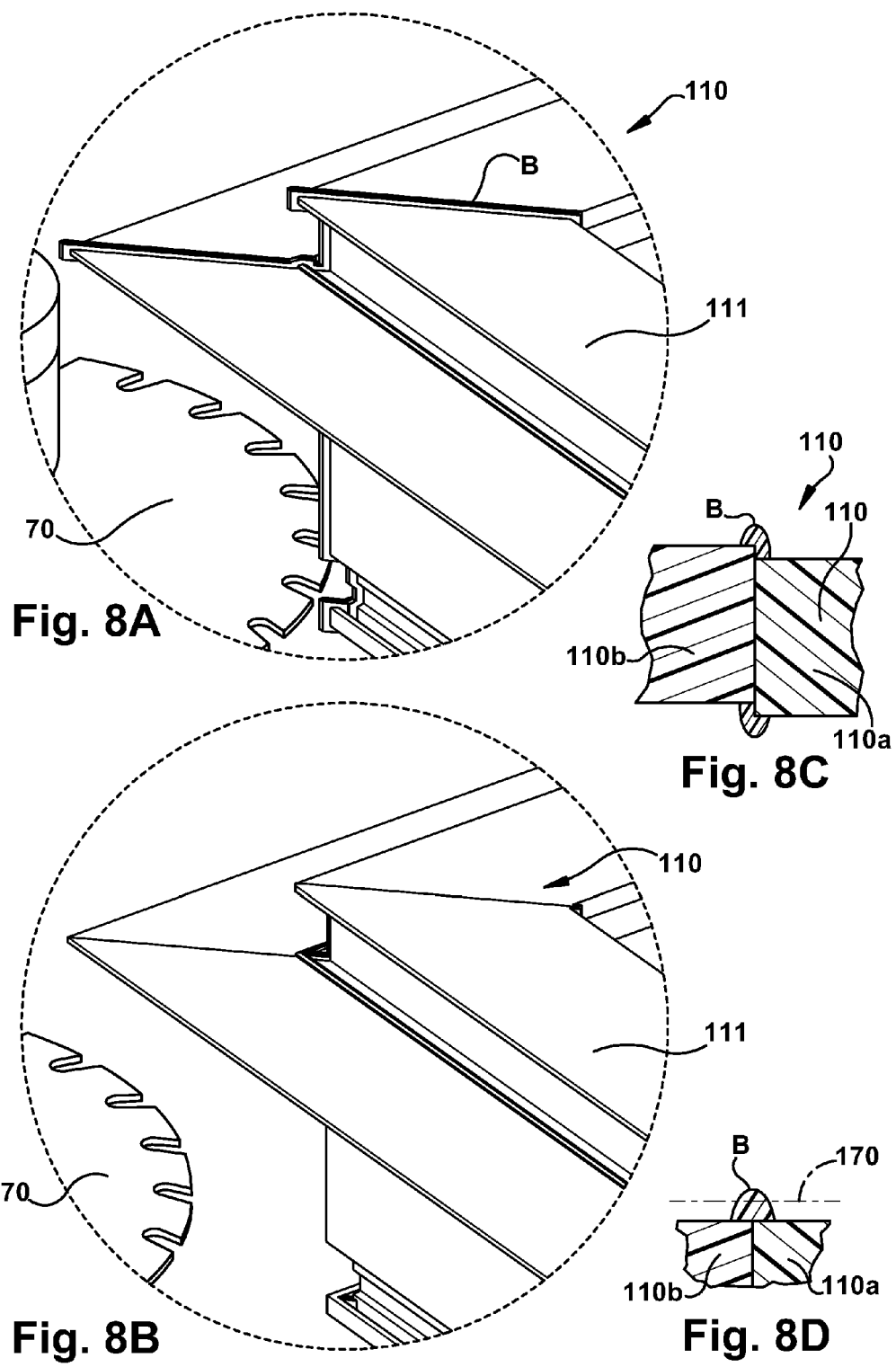

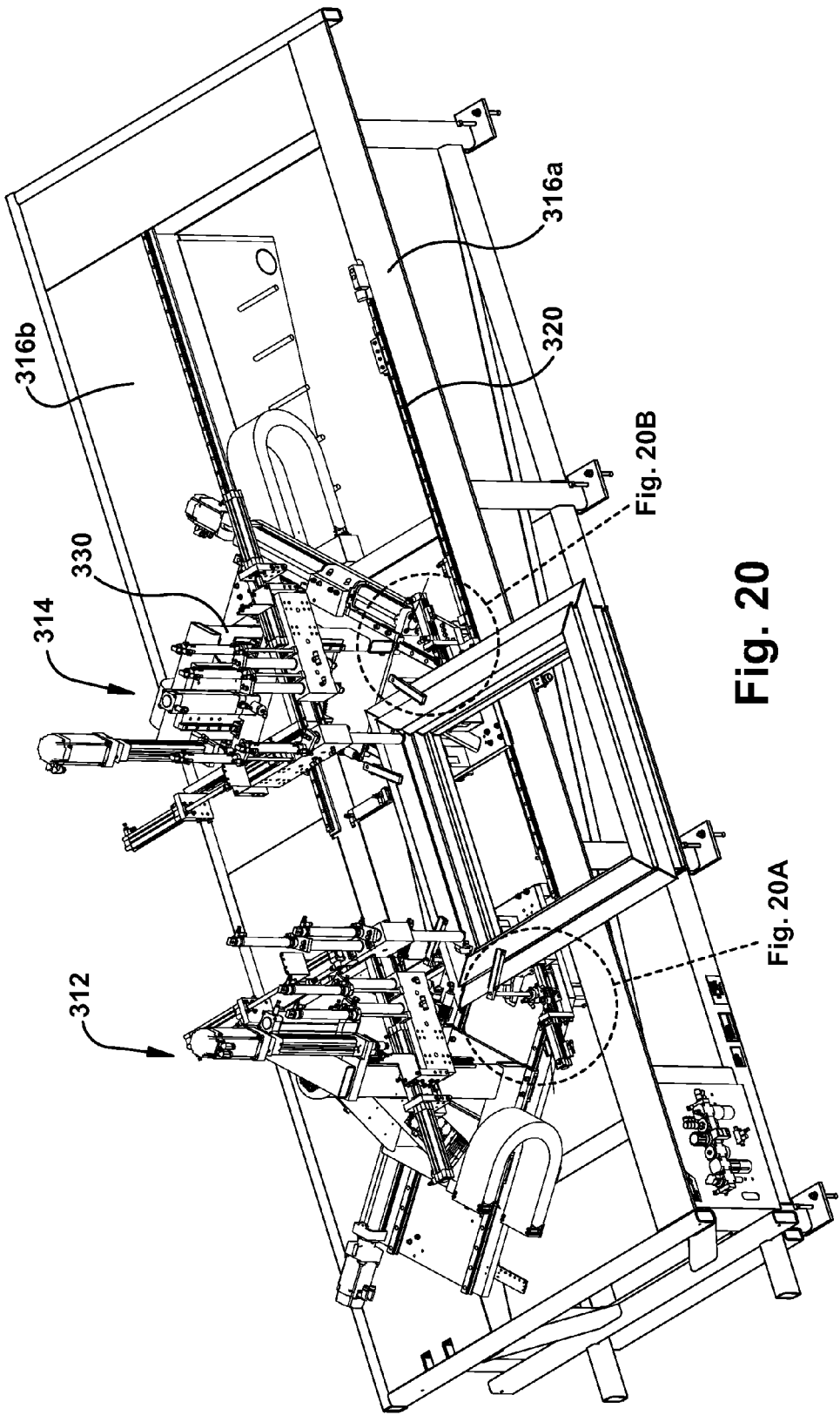

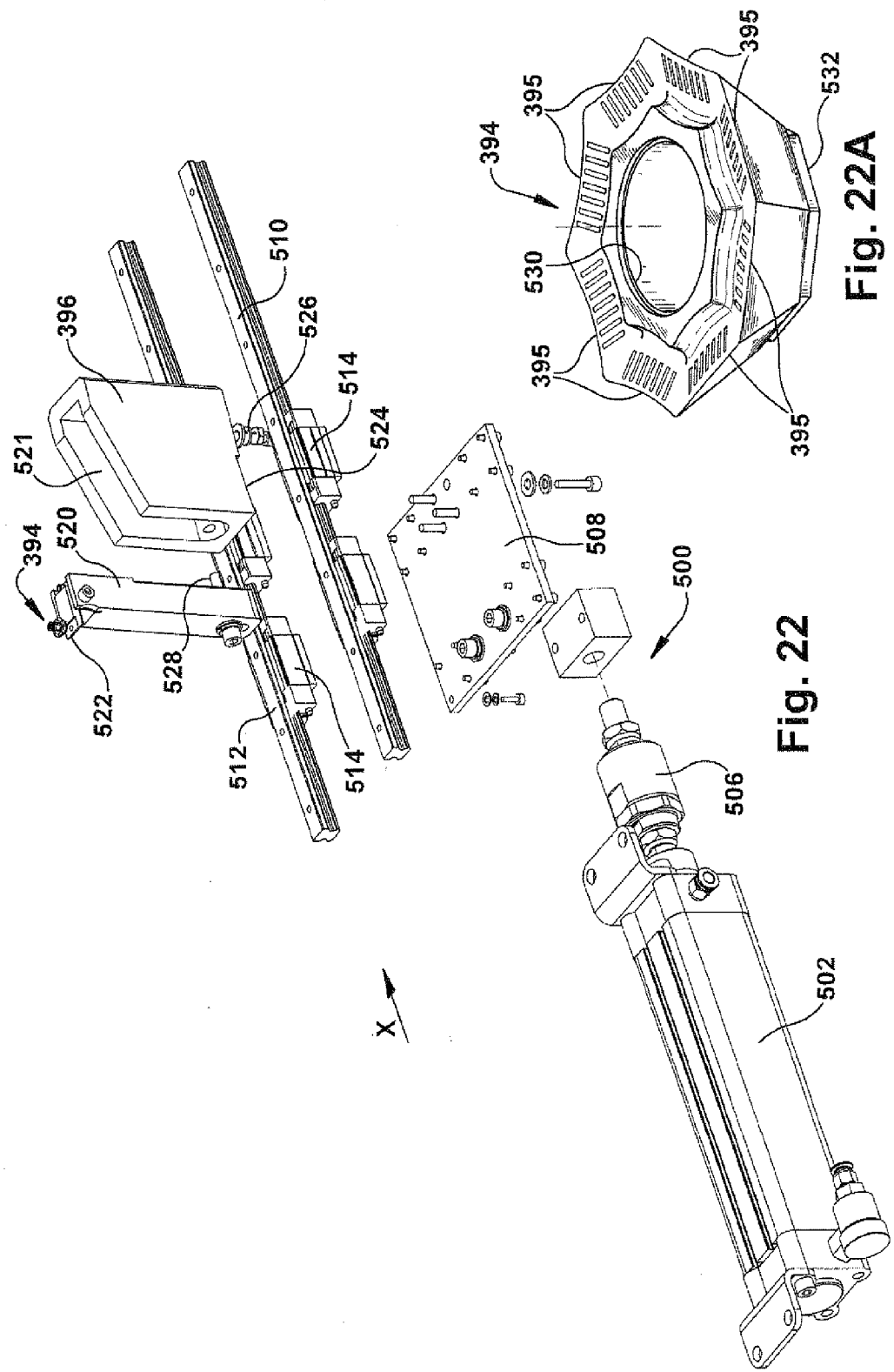

WINDOW PROCESSING SYSTEM COMPRISING A CLEANING STATION WITH MULTIPLE CUTTING SURFACES

CROSS REFERENCE TO RELATED APPLICATIONS

The present application claims priority from patent application Ser. No. 11/865,244 entitled "Window Processing having Inspection and Compensation" filed Oct. 1, 2007 and prior provisional patent application Ser. No. 60/828,782 entitled "Window Processing having Inspection and Compensation" filed Oct. 10, 2006 which are is incorporated herein by reference.

FIELD OF THE INVENTION

The present invention relates to a profile recognition and finishing or cleaning of window frames or sashes constructed from plastic components.

BACKGROUND ART

Plastic components that make a window frame or sash are typically welded together by miter cutting the components to size, heating the mitered ends and then pressing the heated ends together so that the melted ends bond to each other. This process often squeezes some of the material out from between the two pieces which creates a bead of material, commonly referred to as weld flash, requiring further processing to obtain better appearance as well as removing material which may interfere with further assembly of the window itself such as installing an IG unit into a sash or a sash into a frame.

Further processing can be accomplished using a corner cleaner, a machine that removes the weld flash by means of multiple types of tools such as saw blades, knives, end mills or router bits to cut or abrade away the weld flash where it is not desired. Variances in the dimensions of the profile material and/or misalignment of the two parts during the welding process hamper the ability of the machine to consistently remove the weld flash to controlled dimensions due to profile dimensions changing in the frame extrusion.

U.S. Pat. No. 4,909,892 to Quinn et al concerns an apparatus for simultaneously welding two or more pairs of thermoplastic frame elements. U.S. Pat. No. 4,971,639 to Quinn et al concerns a method and apparatus for welding vinyl window and door frames. These patents are assigned to the assignee of the present invention and are incorporated herein by reference.

SUMMARY

A window processing system is disclosed for use in fabricating window frames. After welding at a welding station, a window frame or sash is moved to another processing station where weld flash is cleaned off the frame or sash.

The disclosed window processing system includes one or more cleaning tools. A cleaning tool is used herein to mean any tool for treating or processing by contact, with controlled regions of the frame or sash. Once a frame or sash is positioned at the cleaning station the cleaning tool or tools are actuated to move into a cleaning position relative to selected portions of a window frame or sash.

In accordance with one aspect of the disclosure, a monitor or sensor inspects a profile of the window frame or sash. A controller coupled to the monitor determines a type of window frame or sash based on a sensed profile. Movement of the cleaning tools is controlled to clean or process one or more specified locations of the window or sash based on the sensed profile.

When the window frame members or components are assembled at a weld station, the frame can experience some degree of mismatch or misalignment. Even though the two abutting members of a frame or sash match well, they may not be the same or a consistent dimension. This may cause the cleaning tools to take off too much or too little weld flash and degrade the appearance of the frame or sash. The exemplary system senses both misalignment and dynamically changing size and adjusts flash removal to take into account the specific configuration of the frame or sash.

Another aspect of the window processing system features a cleaning station having one or more cleaning or processing tools and a monitor for inspecting surfaces of a window frame or sash at the cleaning station. A controller has an interface coupled to the monitor for moving the monitor with respect to the window frame or sash as the monitor sends the controller co-ordinate information that characterizes the shape or profile of the surface of the frame or sash. The controller uses this data to direct movement of the one or more cleaning tools to clean specified one or more locations of the window or sash based on said sensed co-ordinates transmitted from the controller from the monitor.

These and other features of the system are disclosed in conjunction with the accompanying drawings.

BRIEF DESCRIPTION OF THE DRAWINGS

FIGS. 8A and 8B illustrate cleaning of weld flash from a corner of a window frame or sash;

FIGS. 8C and 8D are enlarged section view of a region of engagement between frame members;

FIG. 20 is a view similar to FIG. 11 illustrating two spaced apart cleaning heads;

FIG. 22 is an exploded perspective view of a knife assembly for use with the exemplary embodiment; and FIG. 22A is an enlarged perspective view of an exemplary knife.

EXEMPLARY MODE FOR PRACTICING THE INVENTION

Figure 1:
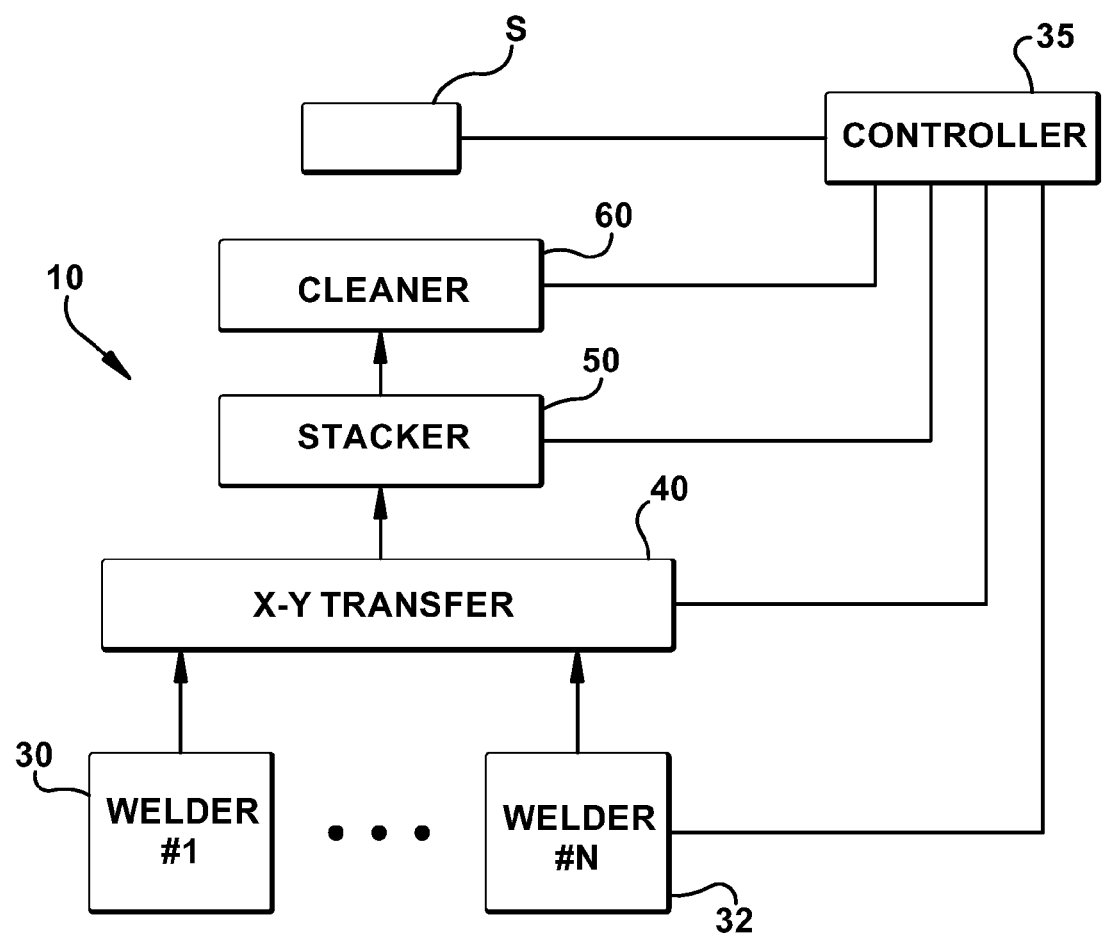
FIG. 1 is an overview schematic block diagram of a window frame or sash processing system.

FIG. 1 schematically depicts a window processing system 10 for fabricating window frames or sashes and includes multiple welding stations 30, 32. In one embodiment, one or more of the welding stations is a sash welding station and one or more additional stations are frame welding stations. Customary usage in the window fabrication business refers to a frame as a stationary part of the window and a sash as the moveable part of the window which moved to open the window.

Typically, each of the welding stations has multiple welding heads that are independently actuated to move into position relative the different parts of a widow frame. In the disclosed embodiment, each welding station can have multiple frames or sashes stacked on top of each other. The welding stations and other stations are controlled by a controller or controllers 35.

An X-Y transfer table 40 supports welded frames delivered by a weld station exit conveyor and includes a mechanism for moving welded frames to a multi-tiered buffer or stacker 50. The buffer accepts frames from the X-Y table and stores the frames in different stacker layers to await cleaning. In one embodiment, belts automatically move the frame into a cleaner at a cleaning station 60. As discussed below, in an alternate embodiment shown in FIG. 10 the welded frame is moved by hand from a welding machine and placed into a cleaning unit.

Cleaning Station

The cleaning station 60 has a plurality of cleaning tools that are independently actuated to move into a position relative to selected portions of the window frame. The controller 35 co-ordinates the operation of the welding heads at the weld stations, the conveyor which ejects welded frames from the welding stations and movement of the components to the x-y table through the stacker 50 to the cleaning station 60. In the exemplary embodiment, a profile of a welded frame or sash placed at the cleaning station is monitored by a sensor S. In one exemplary embodiment this is a visual sensor which can include a laser which scans along a line of the frame profile or a camera based sensor that images an entire region of the frame. Other alternate embodiments utilize tactile or touch sensors for determining a frame profile. In the exemplary embodiment the sensors is a visual sensor that monitors a profile of the frame or sash.

Figure 2:
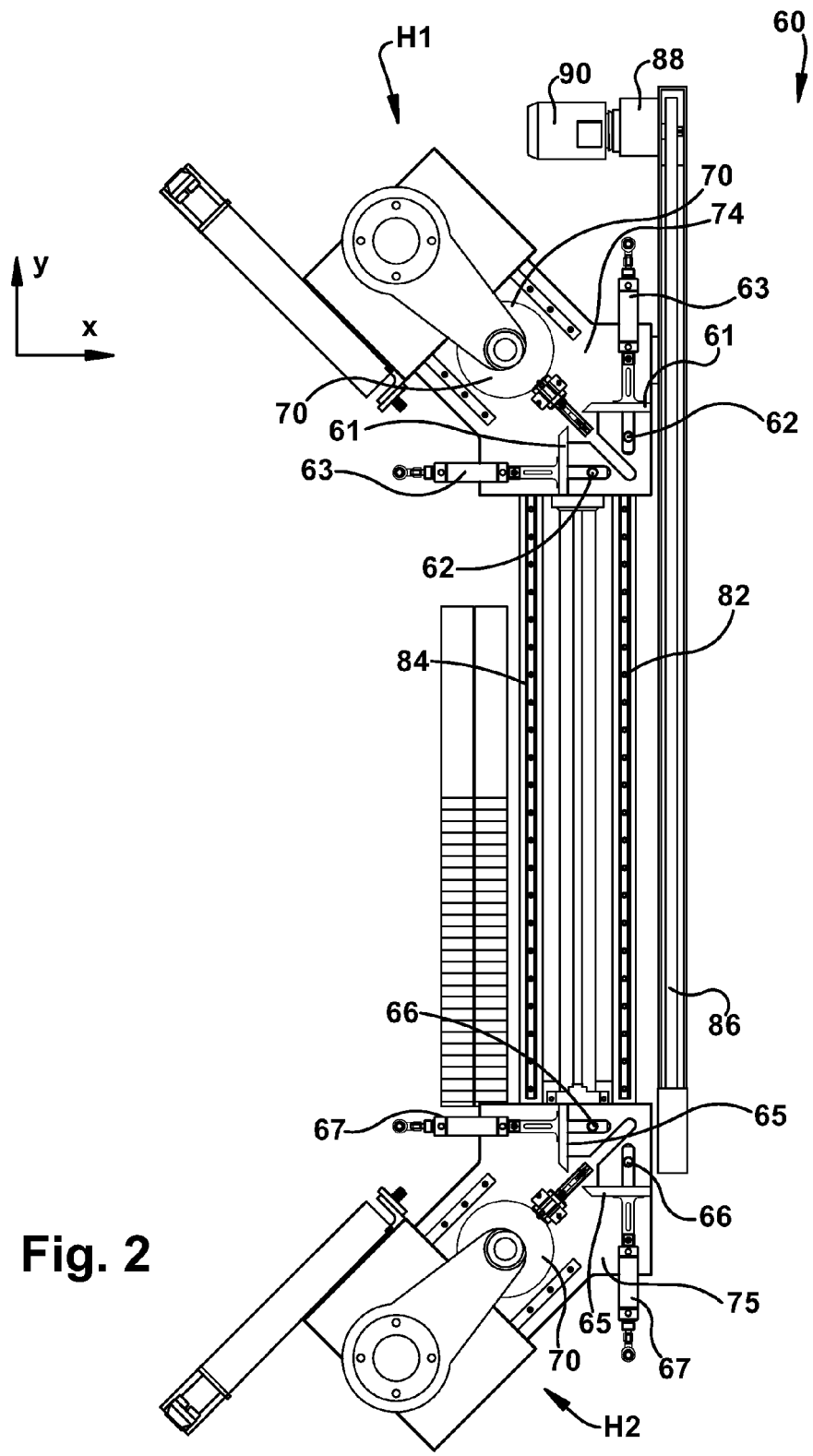
FIG. 2 is a top plan view of a portion of a cleaning station.

The cleaning station 60 shown in FIG. 2 has two cleaning heads H1, H2. Each head includes a number of clamps and corresponding pins for fixing a frame 110 in place. The head H1, for example, has fixed clamps 61 that contact an outer surface of the frame in a region of one corner of a frame or sash. Corresponding pins 62 that are moveable by an air actuated cylinder 63 move back and forth to trap the profile of the frame in place for cleaning. In the disclosed embodiment, when it is clamped in place, the frame or sash 110 has top and bottom surfaces 111, 112 (FIG. 5) that are oriented in a generally horizontal plane with respect to a shop floor. In the embodiment illustrated, the cleaning tools of the heads H1, H2 operate on two corners at a time. The head H2 has stationary fences 65, reference stops 66 and air actuated cylinders 67 that are operated by the controller 35 to trap a second corner of the frame or sash in place. After two corners are cleaned the clamps release the frame or sash and an operator or robot reorients the frame or sash for cleaning of other two corners.

In the embodiment shown in FIG. 2, the cleaning station 60 includes two saws having rotating circular blades 70 that are operatively coupled to the controller 35 and mounted at corner locations of the frame or sash to support plates 74, 75 which also supports the fences 65. As shown in FIGS. 8A and 8B, the saws move in and out to contact corner locations of the frame or sash 110 along an outer periphery. The saws can also contact and abrade away a bead B of weld flash on the top and bottom surfaces 111, 112.

The plate 74 corresponding to the head H1 is supported on rails 82, 84 which allow the plate 74 shown in FIG. 2 to move back and forth in the y direction as defined by the co-ordinate axis of FIG. 2.

Movement of the plate 74 back and forth in the y direction is achieved by a drive belt 86 reeved over a pulley 88 attached to a drive motor 90. By movement of the plate 74 in the y direction, the clamps and corresponding pins are positioned for proper engagement with the outer periphery of the frame or sash. Movement of the plate 74 is achieved by a user interface with a controller for activating the drive motor 90. Once the four clamps are engaged, the cleaning saw blades are moved up and down and in and out to abrade an outer surface of a clamped in place frame or sash 110.

Figure 7:
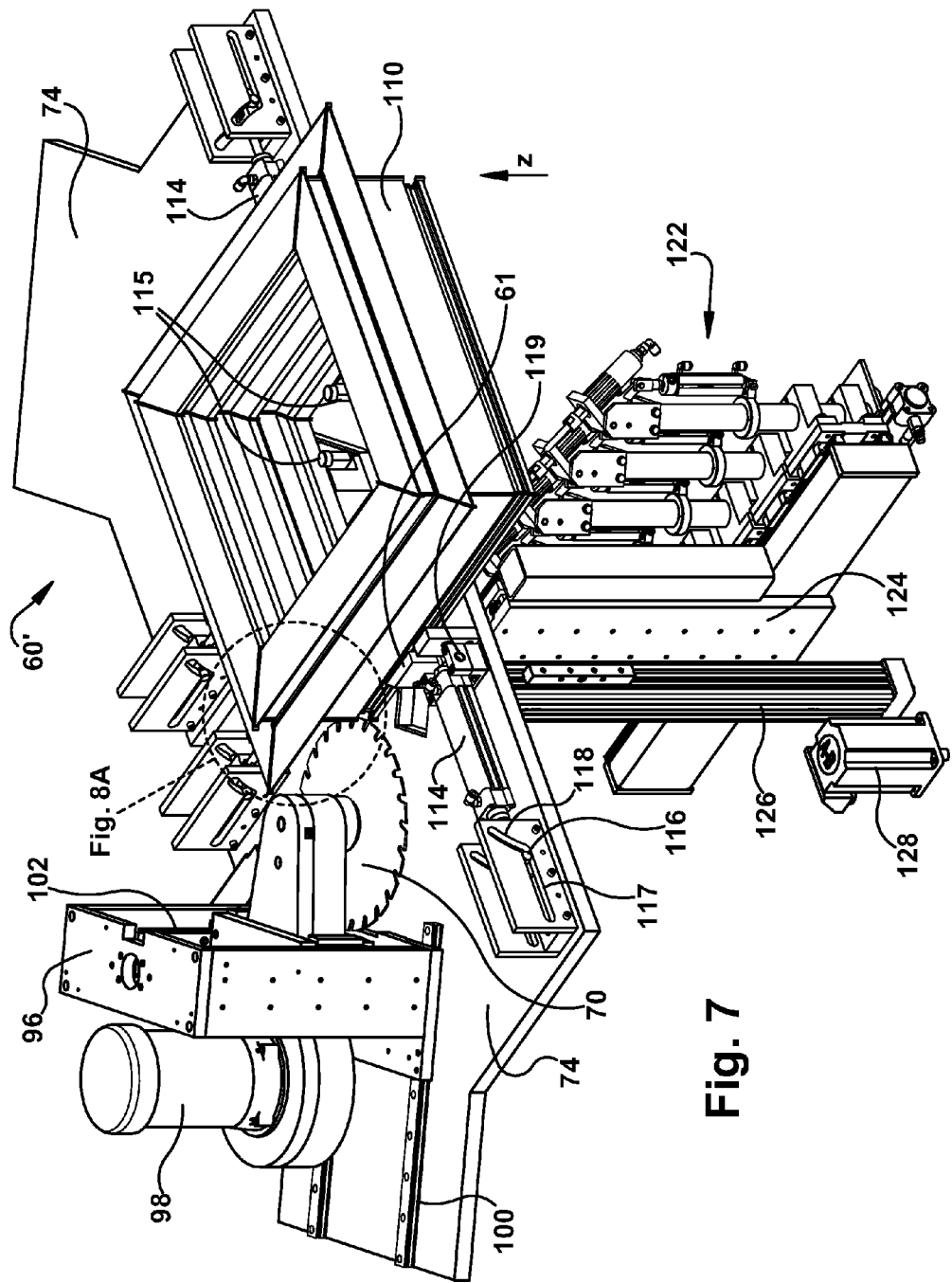
FIG. 7 is a perspective view of a cleaning station with certain components removed for ease in illustration.

A perspective depiction of somewhat different cleaning station 60' is shown in FIG. 7. Like the FIG. 2 depiction, a saw blade 70 is shown positioned next to a corner of a window frame 110. A saw support member 96 supports both the blade and a motor 98 for rotating the blade. A track 100 mounted to the plate allows the support member 96 to move along the track at a forty five degree angle with respect to an outer periphery of the frame 110. An additional track 102 mounted to the support member 96 allows the saw blade 70 to be raised up and down along the z direction to abrade different regions of the outer periphery as well as the top and bottom surfaces 111, 112 of the frame 110.

The FIG. 7 depiction also illustrates operation of the clamps and air driven cylinders for fixing the frame 110 in position. As an air actuated cylinder 114 moves a stop 115 back and forth under supervision of the controller 35, a pin 116 attached to a cylinder rod moves along a slot 117. As the stop nears its fully extended position, the pin 116 engages a raised portion 118 of the slot that pivots the stop about a pivot axis 119 downward out of the way so a frame can be placed against the fence 61.

An additional tool 120 (FIG. 9) is operatively coupled to the controller 35 for cleaning an inside periphery of the frame or sash 110. An array 122 of four such tools are aligned in the vicinity of the cleaning station 60' for movement into operative position relative the frame 110. Each tool has a different work implement for abrading cutting or scraping an inside of the frame to remove weld flash. An appropriate one of the four tools of the array 122 is chosen and attached to a vertically extending plate 124. The plate is attached to a ball screw drive 126 driven by a motor 128 so that the position of the tool 120 can be controlled in the z direction.

The tool 120 has a rotating head 130 coupled to an air motor 131 which can be oriented relative the frame in different orientations by rotating the head about a pivot axis 134. A tool support 132 is moved into position (in the z direction) and the head 130 appropriately oriented by rotating about the axis 134 which is generally horizontal. This rotating head can also be moved in and out in a generally forty five degree angle in the x-y plane to move the head into contact with the corner. In the cleaning station 60' depicted in FIG. 7 each corner has two arrays of such tools, one positioned above the frame or sash and one positioned below the frame or sash. Once the frame or sash is clamped in place an appropriate tool can be brought into engagement with the top and bottom half of the frame simultaneously. Similarly, on another corner, other tool arrays (not shown) above and below the frame contain tools for abrading, scarfing, cutting etc the inside of the frame. In one exemplary embodiment the entire cleaning process for a frame can be performed on the order of 30 seconds or less.

Teaching

There are many different frame and/or sash profiles that the cleaning station 60 must accommodate. In the prior art each different profile required an operator to enter on a console display the profile designation so the cleaning station would know the proper sequence of movements or steps used to clean a given frame or sash of weld flash.

In accordance with the exemplary embodiment, the profile is identified automatically by a sensor or monitor S mounted at the cleaning station 60 (60'). In one embodiment the sensor S is mounted to the tool 120 so that as movement of the tool brings a abrading tool into position relative the frame, the sensors is also brought into position for examining the frame or sash currently positioned at the cleaning station. To enable recognition of all available profiles, a profile training or teaching process must be performed.

Figure 4:
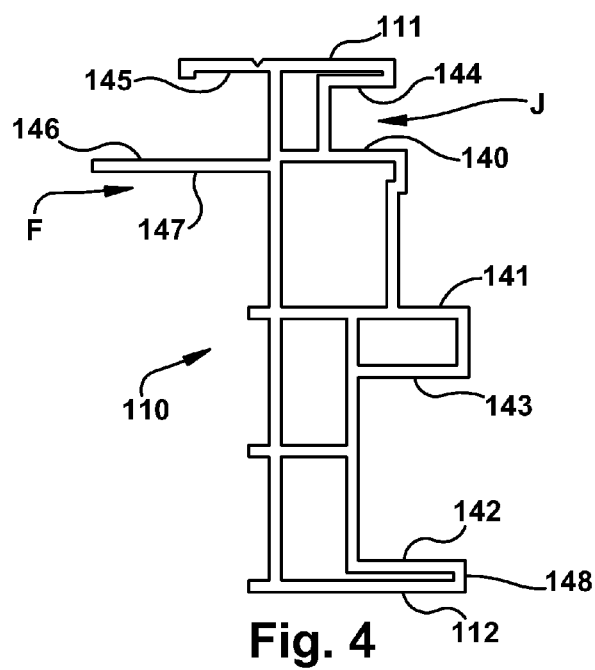
FIG. 4 is a section view illustrating a frame profile signature.

Each frame has multiple recognition features on its outer surface. Turning to the frame depicted in FIG. 4, in addition to the top and bottom surfaces 111, the frame includes other surfaces 140-147 all of whom are likely disrupted by weld flash at the frame corners that occur during welding. In this depiction for example, the surfaces 146, 147 define outer surfaces of a nail fin for attaching the frame to the structure and the surface 145 defines a lip that overlies siding. Similarly, the surfaces 140, 144 might define surfaces for bounding a screen and the surfaces 142, 143 might define surfaces that bound a sash.

Figure 5:
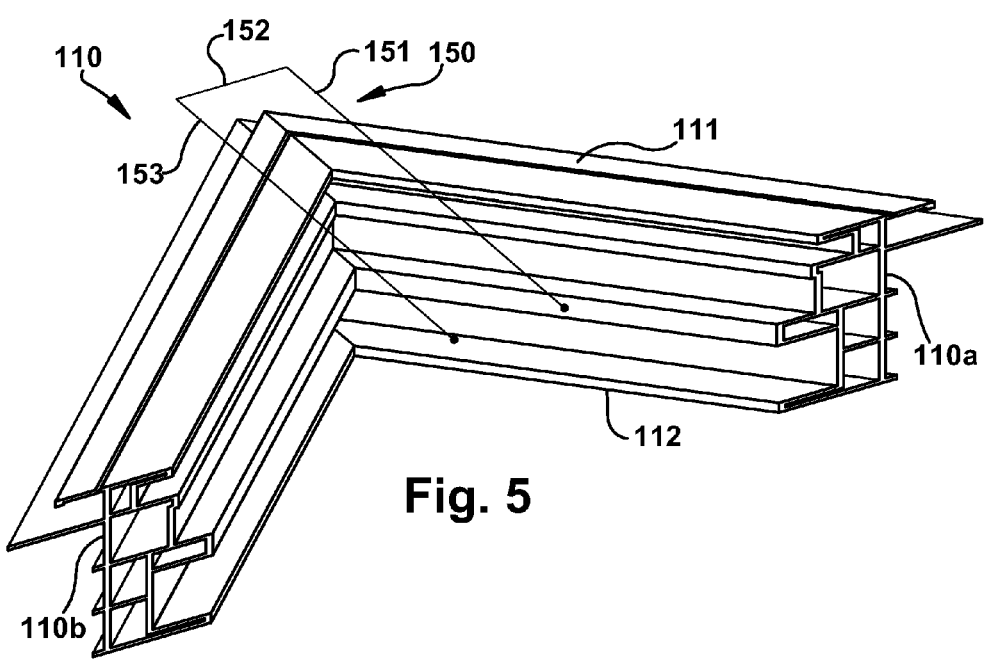
FIG. 5 is a perspective view of two assembled frame or sash members connected at a corner by welding.

In an exemplary embodiment, up to twenty points are calibrated, but more or less points are possible. The profiles of multiple frames and sashes are stored in a control system. In one embodiment the training process is performed using a laser beam so that the distance between the laser beam and a frame or sash surfaces are determined. FIG. 5 illustrates a typical travel path 150. The path has segments 151, 152, 153 that allow the laser to examine and determine the z position (relative a fixed coordinate) of the surfaces illustrated in FIG. 4. Use of the two spaced apart scan path segments 151, 153 allows the controller to determine a profile of two adjoining frame members 110a, 110b so that differences in profile between adjoining member is noted in classifying a frame or sash. In on embodiment, distance readings of the position of the surface of the frame with respect to a reference are obtained at a number of equally spaced recognition points and the number and spaced of these points is programmable by the operator.

Specificity in defining the profiles is a tradeoff with profile recognition speed. In one exemplary embodiment up to six points are located for each different frame type and used by the controller 35 in recognizing the profile. Although a laser sensor is presently preferred, video capture or tactile sensing is also contemplated for use with the invention.

A Profile Teach Program executing on the controller 35 interfaces with the laser sensor S which monitors return signals from the surface of the frame 110 to determine the position of all recognition point locations (a maximum of twelve in one embodiment) and records the measured value for each profile. This creates a finger print of each profile which is stored in controller memory. The Profile Teach Program also allows a user to enter ranges of acceptability for each reading. The user interface presented by the controller also has the ability to bypass one or more of the recognition points for any profile.

Figure 6A:
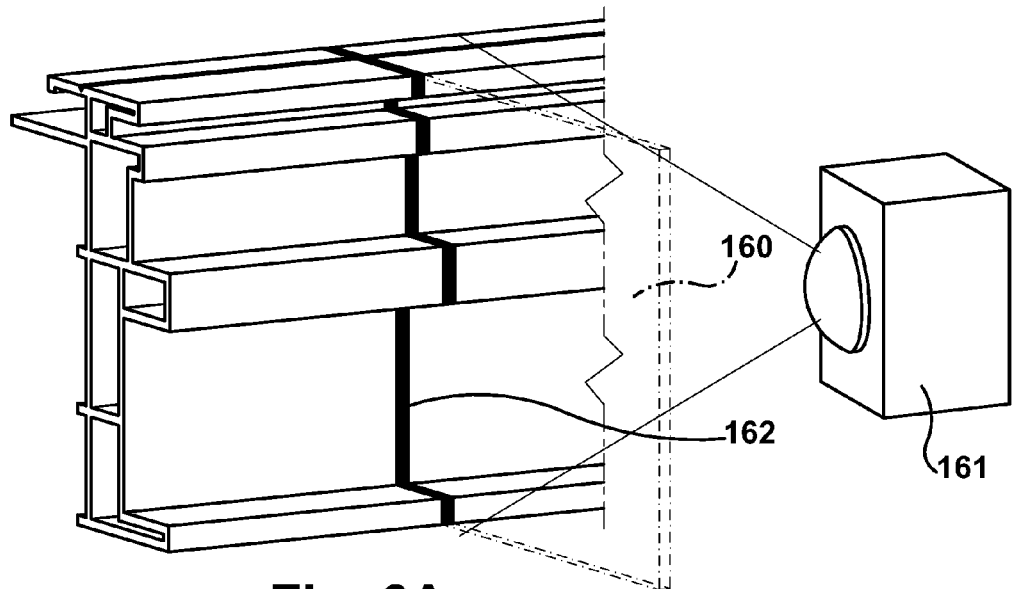
FIGS. 6A and 6B illustrate inspection of different configuration frame or sash members.
Figure 6B:
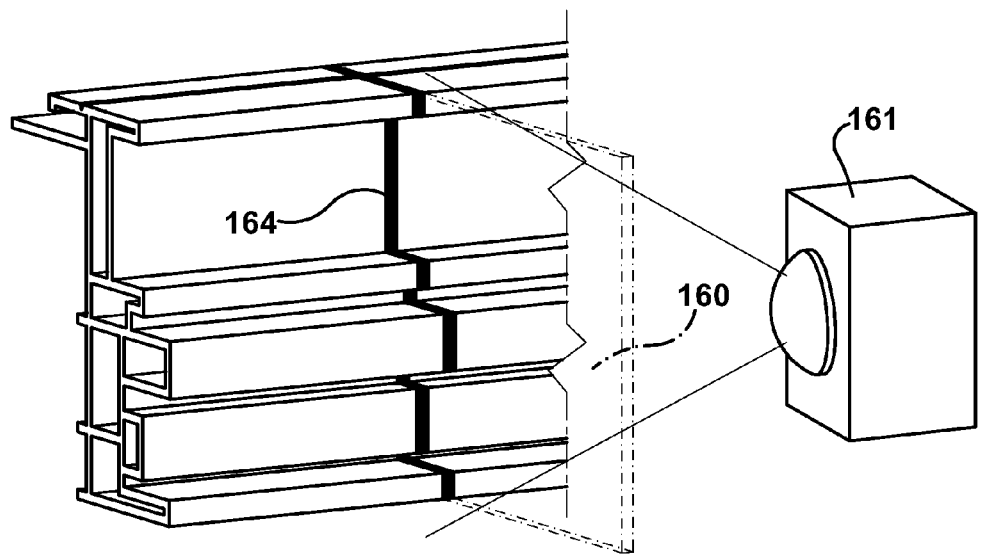

FIGS. 6A and 6B illustrate an alternate image capture based process in accordance with the invention. Two frames having two different profiles are shown in these depictions. During classification each frame is scanned by a laser beam 160 to create a reflected image 162, 164 that corresponds to an image of the inner profile of the frame. This image can be captured by an appropriate image capture device such as a camera 161 having appropriate imaging resolution. This data from the image capture device is fed to the controller and used to define the positions of the frame's defining surfaces for use in subsequent cleaning.

Once the Profile Teach Program learns the finger print of a profile, the controller 35 prompts the user to position the laser sensor to the points of interest that will be used to alter the cleaning process performed at the cleaning station. This step of adjusting the cleaning is referred to as compensation. There can be just one or many compensation points. These points will be measured every time the corresponding profile has been identified. A compensation point may also simply use the data from a recognition point.

Like the method used in the prior art, a user next teaches the controller how to clean the profile by selecting tools from the array 122 and manually cleaning the part by jogging the tools in the required motions. Similarly, the saw 70 is moved relative to the outer periphery of the frame to teach the controller how to clean this portion of the frame.

During this process the user stops at each point in the path of cleaning tool motion and uses the current tool positions to directly transmit data to the controller 35 needed to create a nominal tool path routine for that frame or sash profile.

During this process the user may select compensation points to link to the points of motion. The user can select which axis is affected (this will typically be a vertical shift). The user can also select multiple points which can be averaged and the result linked to selected motion points.

Teach Inspection

In a manner similar to the compensation teaching the laser sensor S will be jogged into position such as an inside corner to inspect for a piece of trimmed weld flash remaining.
An inspection could also be performed by recording the min and max readings as the laser sensor is moved laterally across the cleaned joint between the two adjoining frame members. Ideally this variance is minimized by the cleaning process.

Cleaning Compensation.

Consider now the depictions of FIGS. 8C and 8D. In FIG. 8C a mismatch between adjoining frame members 110a, 110b has occurred. In this depiction a top surface of the member 110b is higher (in the y direction) than a top surface of the member 110a. A preferred response to this situation is to abrade the corner of the frame until the bead B is worn down to the top surface of the member 110b. An uncompensated cleaning process might clean by abrading to the average of the two surface levels or worse might abrade to the top surface of the member 110a. Turning to FIG. 8D, a situation is depicted wherein the frame members 110a, 110b match along a top surface at the abutment corner, but have a slightly smaller width than their specification calls for. Uncompensated the cleaning tool will clean as though the frame had a top surface 170 so it leaves part of the bead B in place. By compensating for individual frame variations, the cleaning tool abrades to the actual top surface of the frame feature and neither leaves weld flash it should remove or cleans too much to take off a surface of the frame as well as the weld flash.

Figures 8E, 9:
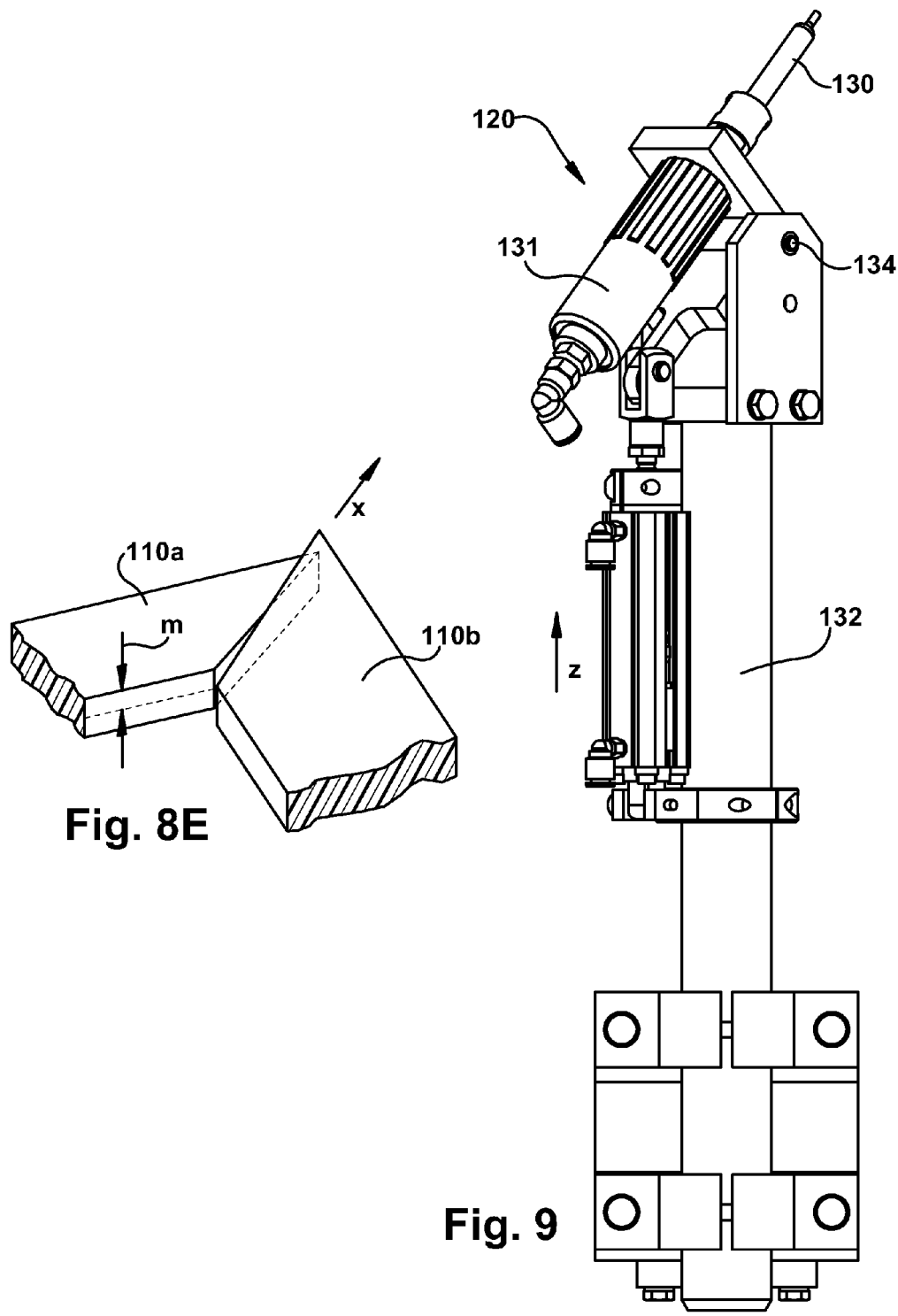
FIG. 8E shows adjoining welded frame members wherein too high a region occurs on the inside of one frame member and too high a region occurs on an outside of frame on an abutting frame member.
FIG. 9 is a side elevation view of a cleaning tool having a rotating head for contacting an interior profile of a frame or sash.

FIG. 8E illustrates an addition situation that needs a special abrading process if the best solution to the illustrated mismatch is to be achieved. Note, the bead has been deleted from this depiction for ease in illustration. Each of the two members 110a, 110b has a slight tilt (exaggerated in the depiction) with respect to the other. Note, one or the other might be level in the x-y plane or both could be tilted with respect to that plane. In either event the movement of the abrading tool must be adjusted during movement from the inside to the outside and made to come into contact with only one or the other of the two frame members as the tool is moved along the x direction. Stated another way, on the inside of the frame the abrading should occur on the frame member 110a starting with a maximum amount of abrading M (the mismatch) and proceeding linearly a lesser amount until reaching approximately the mid point of the frame. If the frame member 110b is level, then this will be achieved by a simple x direction movement of the tool until a midpoint of the frame is reached. This abrading is followed by a side gradual downward movement (y direction) that brings the tool into contact with the abutting frame element 110b so that it can be worn away to match the surface of the frame 110a. Assume the frame component 110b is level, then without this downward movement there would be a mismatch between the two components 110a, 110b.

Figure 3:
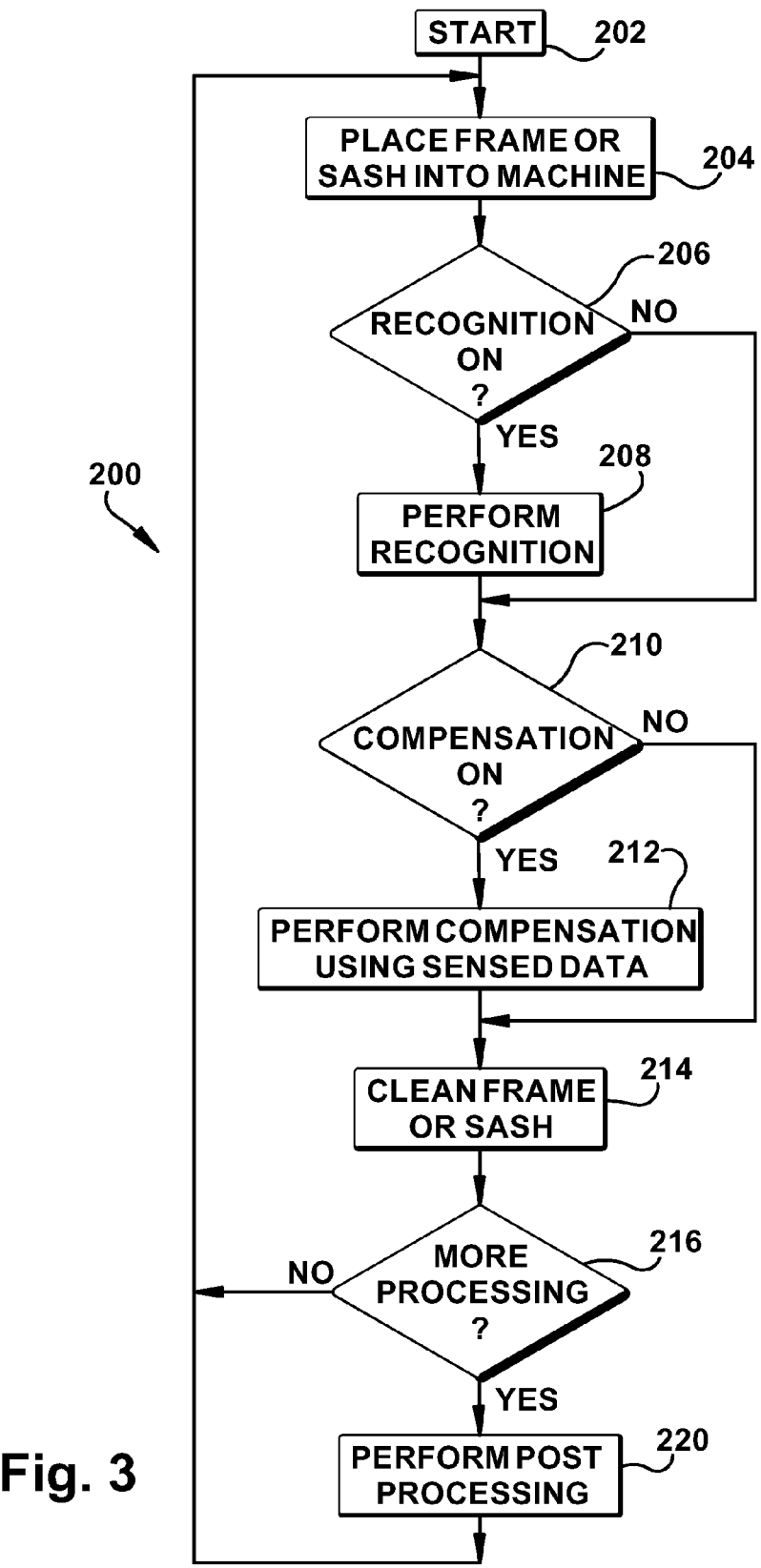
FIG. 3 is a flow chart of an exemplary cleaning process.

The flowchart 200 of FIG. 3 illustrates in an overview way, a process of cleaning that begins when the controller 35 is activated or started 202. A frame or sash is placed 204 into one of the alternate cleaning stations 60, 60', 300 and clamped in place. If the controller 35 determines 206 that frame recognition has been turned on by the user, the controller 35 performs a recognition stage or step 208. The controller then determines 210 if compensation is turned on. If so, the controller performs a compensation routine 212 as the frame is cleaned 214. In one exemplary embodiment of the invention, the same sensing by the sensor S is used to recognize or identify a frame or sash profile as well as determine how to perform the compensation. Stated another way, only one pass of the sensor S relative to the frame or sash profile is needed to both determine the profile and to obtain data points for adjustment during compensation.

Once the frame or sash has been cleaned, the controller 35 checks to determine 216 if post processing is turned on. If post processing is turned on, the controller inspects the cleaned frame to determine whether the frame or sash has been cleaned within an acceptable tolerance. Post processing 220 is performed with the aid of the sensor which images the corners and allows the controller 35 to evaluate the acceptability of the cleaning by comparing the cleaned product with standards regarding the final finish of the cleaned product. If the product inspection fails, the controller can direct the tools to touch up the cleaning process or may merely designate the product for additional processing without actually performing the subsequent cleaning. Whether or not the product undergoes post cleaning processing, the frame or sash is removed or re-oriented and another frame corners placed into the cleaning station for processing.

The option of turning on and off compensation and recognition is to enhance throughput. If for example a run of many identical frames or sashes is being cleaned perhaps recognition is turned off with the caveat that compensation would still check to assure compensation limits are not exceeded. If the particular frame or sash is not subject to variation in configuration, the cleaning compensation can also be turned off.

The process of determining a particular frame type or style involves storing nominal frame dimensions with respect to a reference position for each frame and then comparing a sequence of sensed positions, again with respect to the reference position for the frame or sash under examination. The tolerance level for deviations is in one exemplary embodiment made to depend on the location of the sensed point. In one embodiment, for example, a region on the fin F (FIG. 4) is determined to match with a reference point already stored in controller memory if the sensed point in the z direction is within + or −¼ inch of the reference. In the region of the J channel J, the sensed point is determined to agree if the sensed point is within + or −⅛ inch. These dimensions are illustrative only but do represent suitable parameters for recognition using the system.

Alternate Cleaning Station 300

Figure 10:
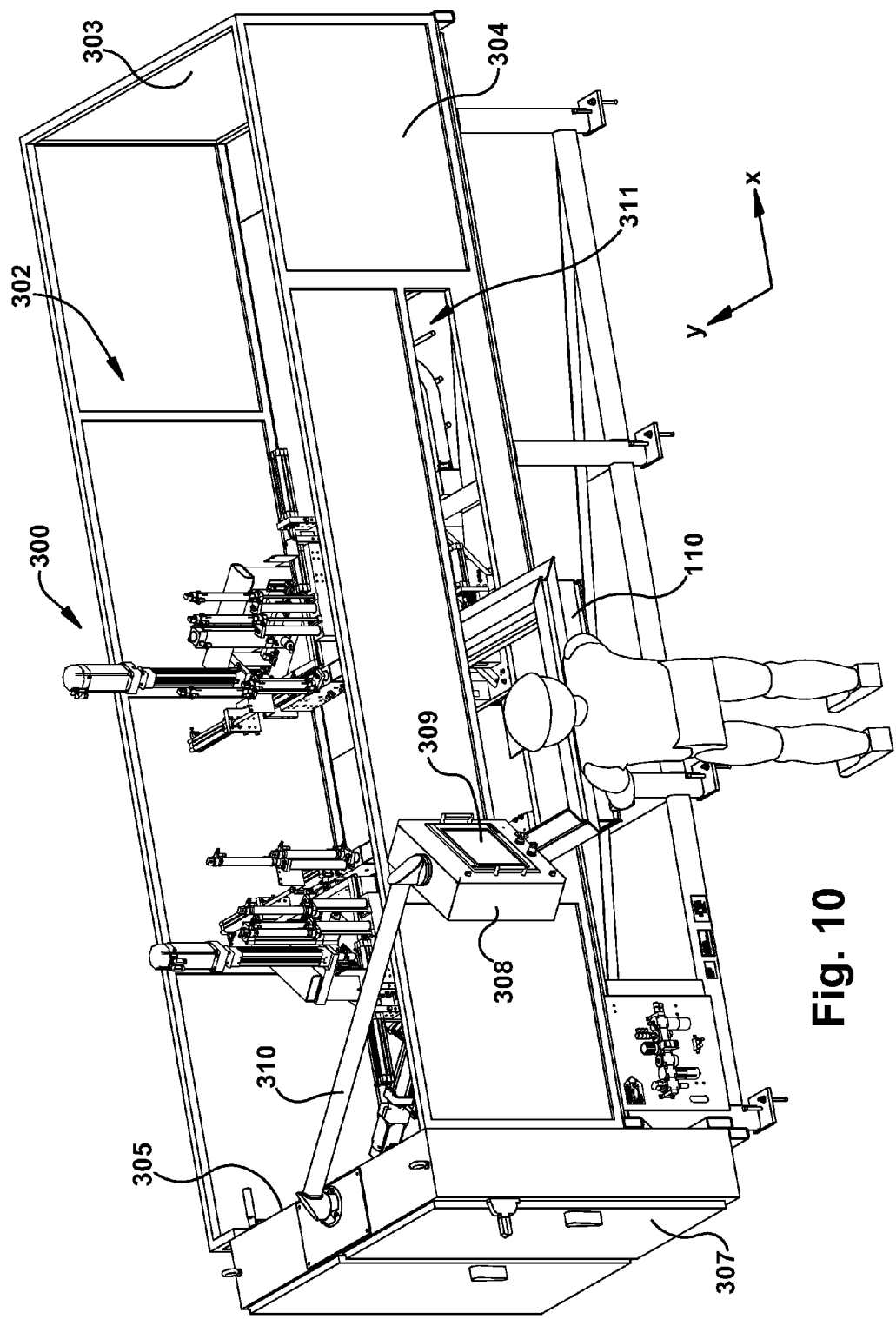
FIG. 10 is a perspective view of an alternate cleaning station with an operator guard in place.
Figure 11:
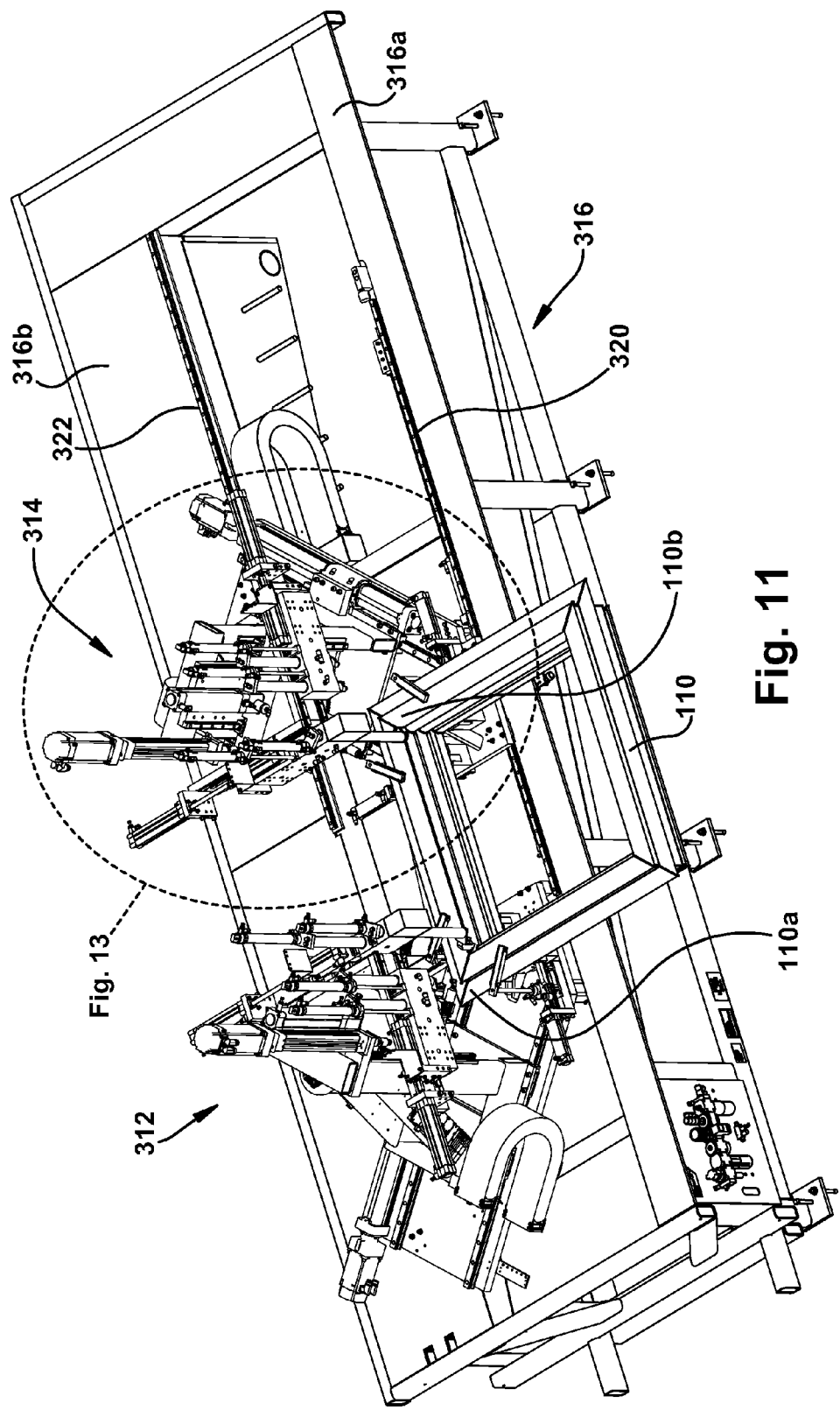
FIGS. 11 and 12 are perspective views of the alternate cleaning station of FIG. 10 with the guard removed.
Figure 12:
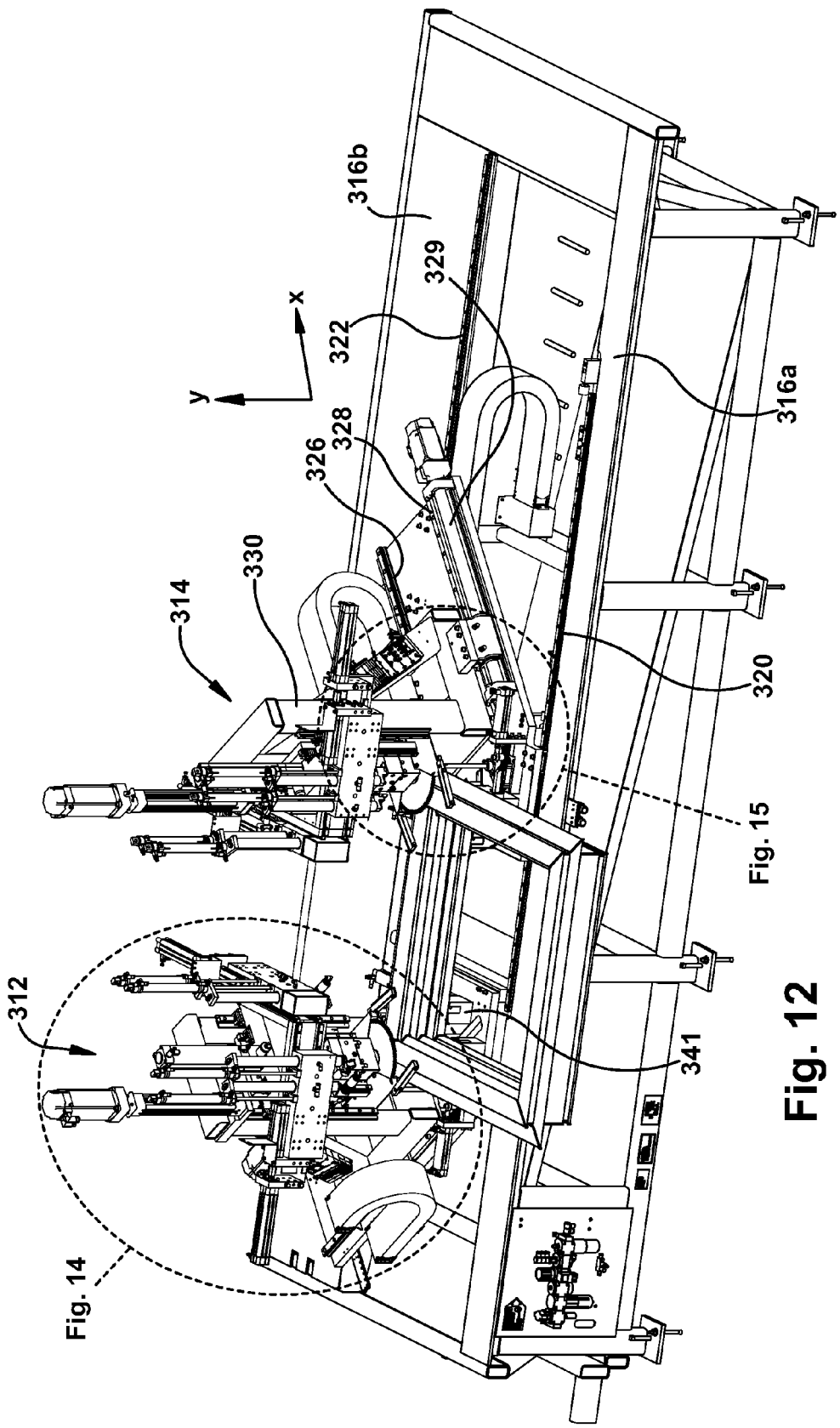

An alternate exemplary cleaning station 300 shown in FIGS. 10-12 has a shield 302 that defines an interior region bound by shield walls 303-306 that can be removed for cleaning station maintenance. A cabinet 307 at one end of the station 300 supports a computer controller 35 that communicates with a viewing monitor 308 having a touch screen 309 for accepting operator commands. The viewing monitor 308 is mounted at one end of an adjustable arm 310 which can be pivoted to selectively position the viewing monitor 308 in relation to the cleaning station 300. An opening 311 in the side wall 304 allows the operator to insert a frame or sash 110 that has been moved to the cleaning station 300 from a weld station onto a support for cleaning.

Two cleaning heads 312, 314 supported by a stationary frame 316 (FIG. 11) have a number of clamps for fixing a frame 110 in place prior to cleaning. The head 312 is fixed in relation to the stationary frame 316 and includes movable clamps that contact an outer surface of the frame or sash in a region of one corner 110a (FIG. 14) of a frame or sash 110.

The second cleaning head 314 moves back and forth along a set of parallel tracks 320, 322 supported by elongated frame members 316a, 316b under control of the controller 35. Movement of the head 314 on these tracks allows the cleaning station 300 to accommodate different size frames or sashes for cleaning by adjustment of the separation between the two heads 312, 314. In this disclosed embodiment the controller 35 includes a industrial computer which presents a user interface and a programmable logic controller (PLC) that accepts signals from the computer to clamp the frame as well as manipulate cleaning tools. One suitable PLC motion controller is model number X20CP1485 commercially available from B & R automation.

Figure 13:
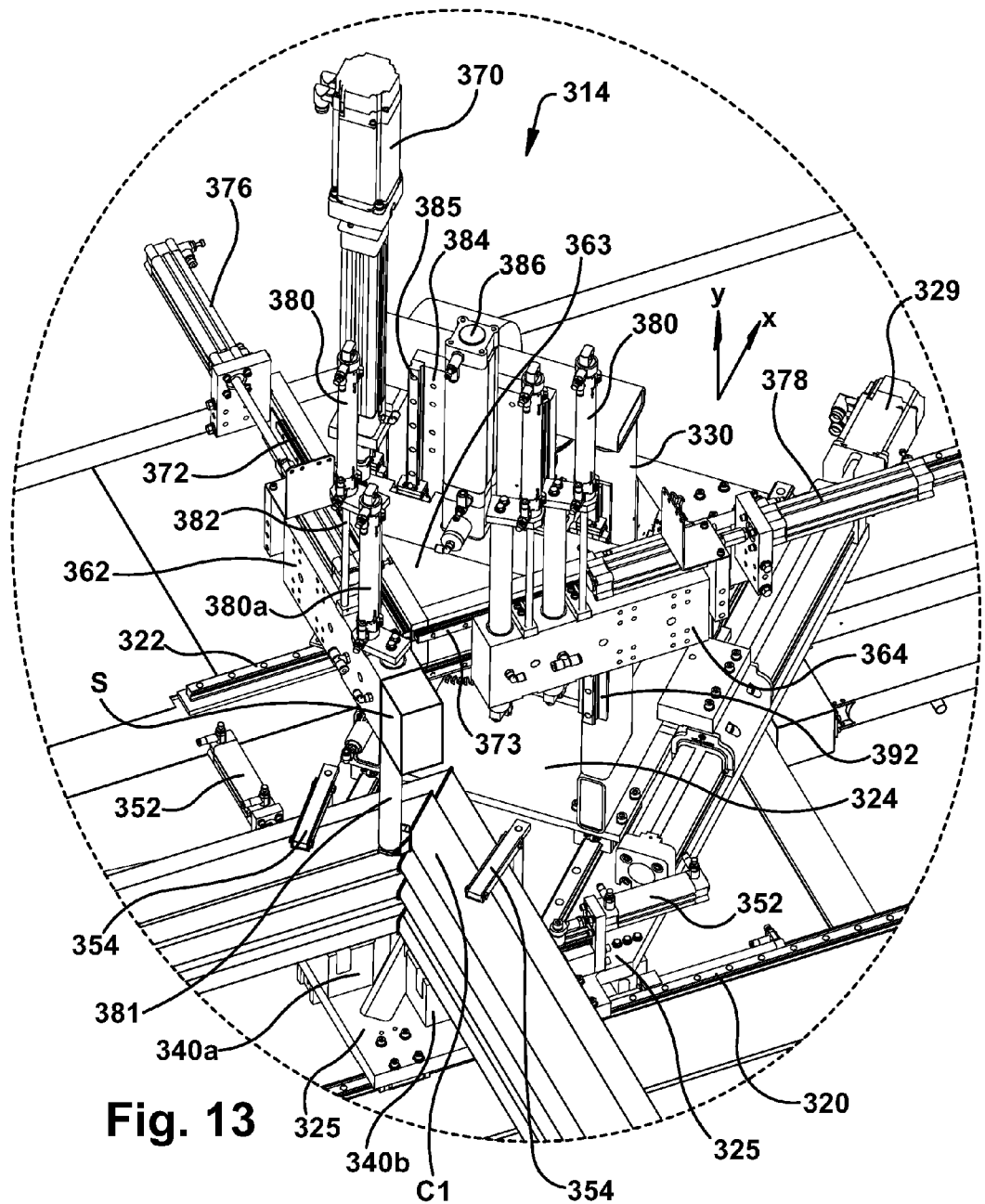
FIGS. 13-15 are enlarged perspective view of one cleaning head of the alternate cleaning station.

FIG. 13 is an enlarged perspective view of the movable cleaning head 314 that cleans a corner region 110b. The head 314 is mounted to a movable, generally horizontally oriented support plate 324 which in turn is mounted to a movable base 325 that moves along the two tracks 320, 322. The base 325 is connected to a drive (not shown) coupled to the controller 35 for moving the base 325 back and forth to adjust separation of the heads. The plate 324 moves on two guides or tracks 326, 328) coupled to the base. These two tracks run parallel to an x direction of the head as defined in FIG. 13. This x coordinate is one parameter the controller 35 can adjust for the individual cleaning tools that make up the head 314.

A servo drive 329 moves the plate 324 and hence the head back 314 back and forth in the x direction (along these guides 326, 328) to position the cleaning head in relation to a corner region C1. Extending upwardly in the y direction from the plate 324 is a support carriage 330 made up of multiple interconnected tubular support members. This support carriage moves with the plate 324 as the servo drive 329 is actuated by the controller.

When moving the frame or sash into position, the controller retracts the head (in the x direction) and the operator places the frame or sash against corner supports or rests 340*a*, 340*b* (FIG. 13), 341*a*, 341*b* (FIG. 17) at the two corners of the frame to be cleaned. Note, the rests 340*a*, 340*b* beneath the corner region C1 are movable with the base 325 while the supports or rests 341*a*, 341*b* beneath the corner region C2 are stationary and supported by the frame 316. The frame or sash 110 is stationary with respect to the elongated beam 316*a* of the frame 316. In the disclosed embodiment, when clamped in place, the frame or sash 110 has top and bottom surfaces that are oriented in a generally horizontal plane with respect to a shop floor. In the embodiment illustrated, the cleaning tools of the heads 312, 314 can simultaneously clean the two frame corner regions C1, C2 at the same time.

Figure 17:
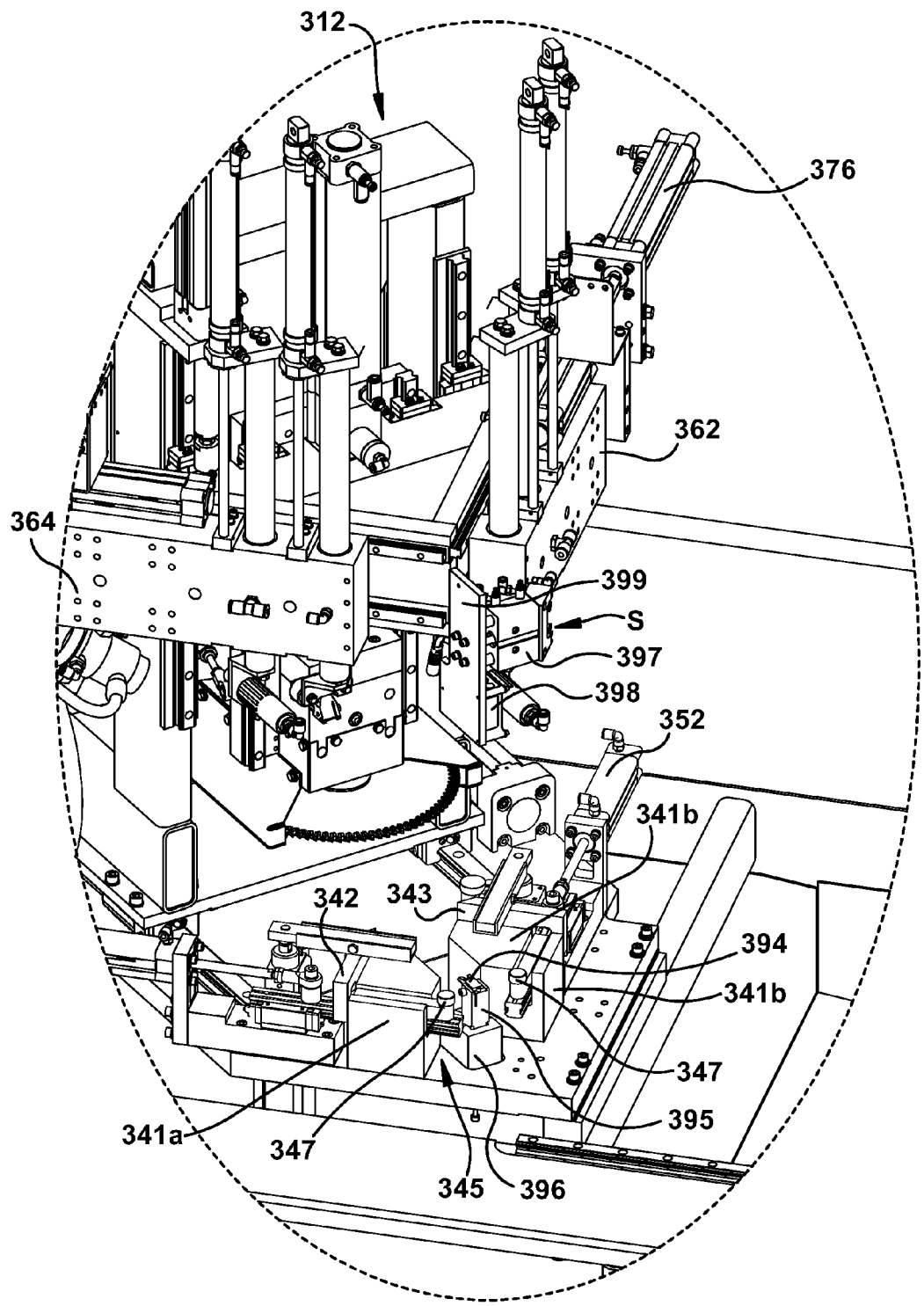

Each head has two movable side gates or clamps 347 (FIG. 17) for engaging inner frame surfaces 148 (see FIG. 4) once the frame has been placed onto the corner rests at the cleaning station 300. Elongated arms 350 extend through grooves in the corner rests on which the frame 110 is supported. As shown in FIG. 17 one rest component 341*a* has an abutment 342 and a second rest component 341*b* has a second, perpendicularly oriented abutment 343. Similar abutments are formed by the rests 340*a*, 340*b* at the region of the other frame corner. The arms 350 are coupled to air actuated cylinders 352 that are operated by the PLC. Clamps 347 coupled to the arms trap the first and second corners of the frame or sash in place against the abutments 342, 343. The clamps 347 have rotatably mounted cam members which can rotate when an inner surface of the frame 148 (FIG. 4) is clamped by activation of the air cylinders 352.

Arm clamps 354 that contact a top surface of the frame are maintained in a raised and pivoted position relative the support rests 340*a*, 340*b*, 341*a*, 341*b* as the frame 110 is moved into cleaning position. Each of the arm clamps has an associated air driven cylinder coupled to an associated actuator 356 to move the clamp into contact with an upper surface of the frame. In an exemplary embodiment, each corner region C1, C2 has two such top arm clamps 354 extending along the x direction contacting top surfaces of adjacent frame components that meet at the frame corner. After two corners are cleaned the arm clamps 354 and side clamps 347 release the frame or sash and an operator (or robot) reorients the frame or sash for cleaning of its other two corners. Movement of the side clamps is monitored by LVDT sensors 357 mounted to monitor movement of an internal drive mechanism of an associated drive cylinder 352 which extends and withdraws the clamps 347.

Figure 14:
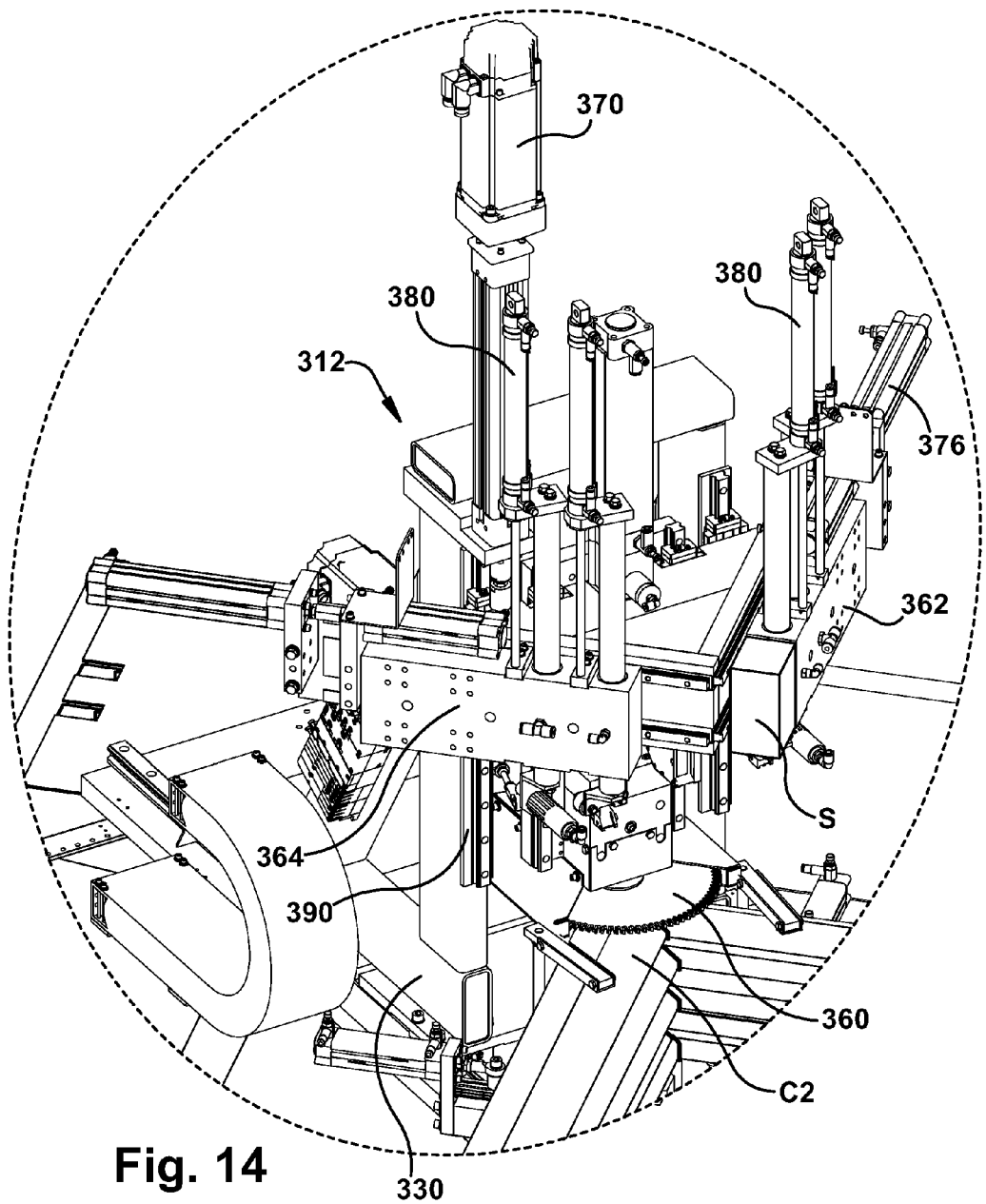
Figure 15:
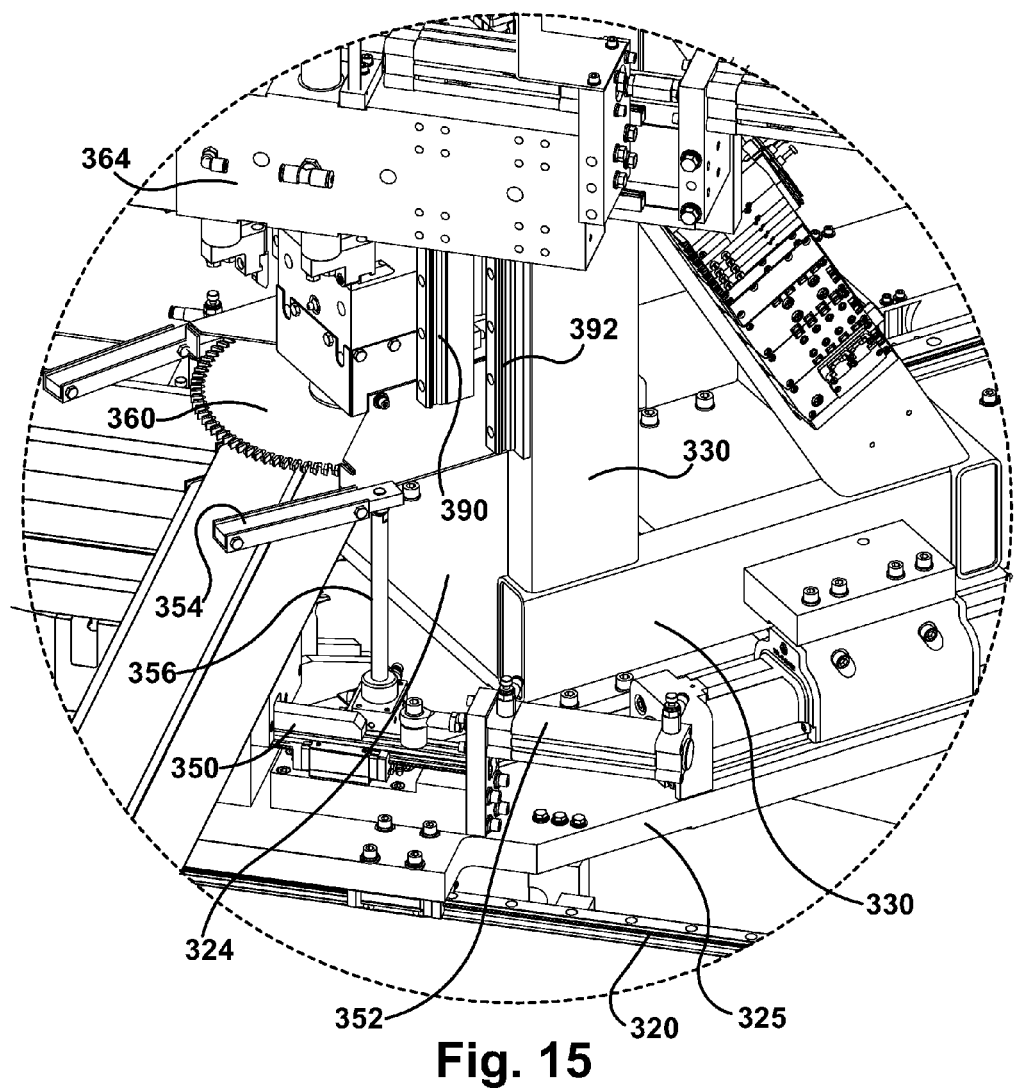
Figure 16:
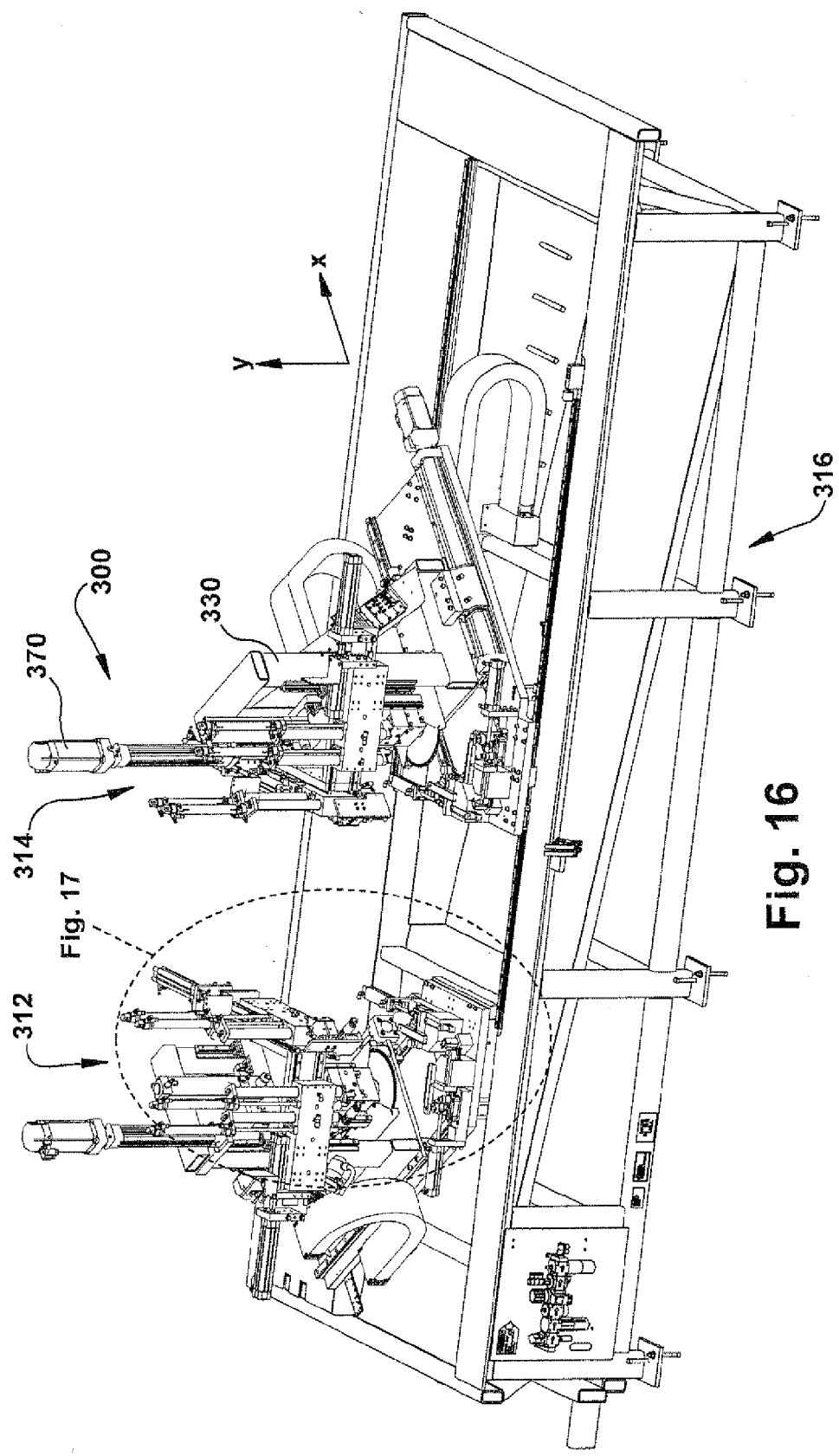
FIGS. 16 and 17 are perspective views of the alternate cleaning station with no frame or sash in place in a region of the cleaning heads.

In the embodiment shown in FIGS. 13 and 14 each of the heads includes a saw assembly having a rotating circular blade 360 operatively coupled to the PLC and mounted at corner locations of the frame or sash and supported for up and down and in and out movement by the support carriage 330. The saws move in and out (x direction) and up and down (y direction) to contact corner locations of the frame or sash 110 along an outer periphery. The saws can also contact and abrade away a bead B of weld flash on the frame top and bottom surfaces.

Additional tools at each of the heads are operatively coupled to the controller 35 for cleaning either an inside or an outside surface of the frame or sash 110. Four such tools are positioned at each cleaning head for controlled movement near the corner region of its respective head. Each tool has a different work implement for abrading, cutting or scraping a frame surface to remove weld flash. In one embodiment, only one tool is used to abrade each frame corner at a time. An appropriate one of the four tools is chosen (typically as part of a user programmed regimen) and moved first in the x direction to an appropriate position and then in a y direction into juxtaposition with the frame. In alternate embodiments, multiple tools can treat a frame or sash corner simultaneously.

Turning to FIG. 13, these four additional tools are mounted to one of two tool blocks 362, 364 that move independently from each other in generally perpendicular directions and are supported by a tool support 363 mounted for up and down movement in the y direction. Four exemplary tools might include an air driven router bit, a vertical operating knife, a horizontal operating knife, and a drill. In FIG. 13 the tool block 362 is moved into operative position by first moving the support assembly 330 to an appropriate x co-ordinate and then causing the tool block 362 to move along a track 372 by activating an air cylinder 376 having an output shaft connected to the support 372. Extending the output shaft of the air cylinder 376 moves the support 362 in a direction at a forty five degree angle with respect to the x direction to a controlled position with respect to the support assembly 330. In this position, the controller actuates an appropriate one of four air actuated cylinders 380 having output shafts 382 that can be drawn into the cylinder to extend an associated tool downward in the direction as shown in FIG. 13.

FIG. 13 shows one particular cylinder 380*a* mounted to the moveable tool block 362 in an actuated state so that a vertically extending tool support 381 is extended downwardly toward the frame region C1. In particular, the individual tool support 381 can extend to a position that its associated tool is brought into close relation with designated inner surfaces of the frame.

The tools mounted to tool blocks 362, 364 are connected to a tool support 363 whose vertical position is adjusted by a servo drive 370 for positioning the support 363. A vertically oriented plate 384 is coupled to the support 363 by a track 385 for guiding up and down movement of the support plate. The saw assembly is coupled to the support plate 384 and upon actuation of a drive cylinder 386 the saw assembly moves in relation to the assembly 330 a controlled amount. The tool supports are also mounted to a track that runs horizontally along a front surface of the tool support 384.

The fixed or stationary cleaning head 312 is similar in construction regarding the saw and additional tool sets. Like reference characters have been used to depict like elements in FIGS. 14 and 17.

Once the frame or sash corners are clamped, an appropriate tool of the head 314 can be brought into engagement with the frame corner region C1 simultaneously as the other head 312 is treating the corner region C2. In one exemplary embodiment of a cleaning station the entire cleaning process for a frame can be performed on the order of 30 seconds or less.

Bottom Knife 394

Figure 21:
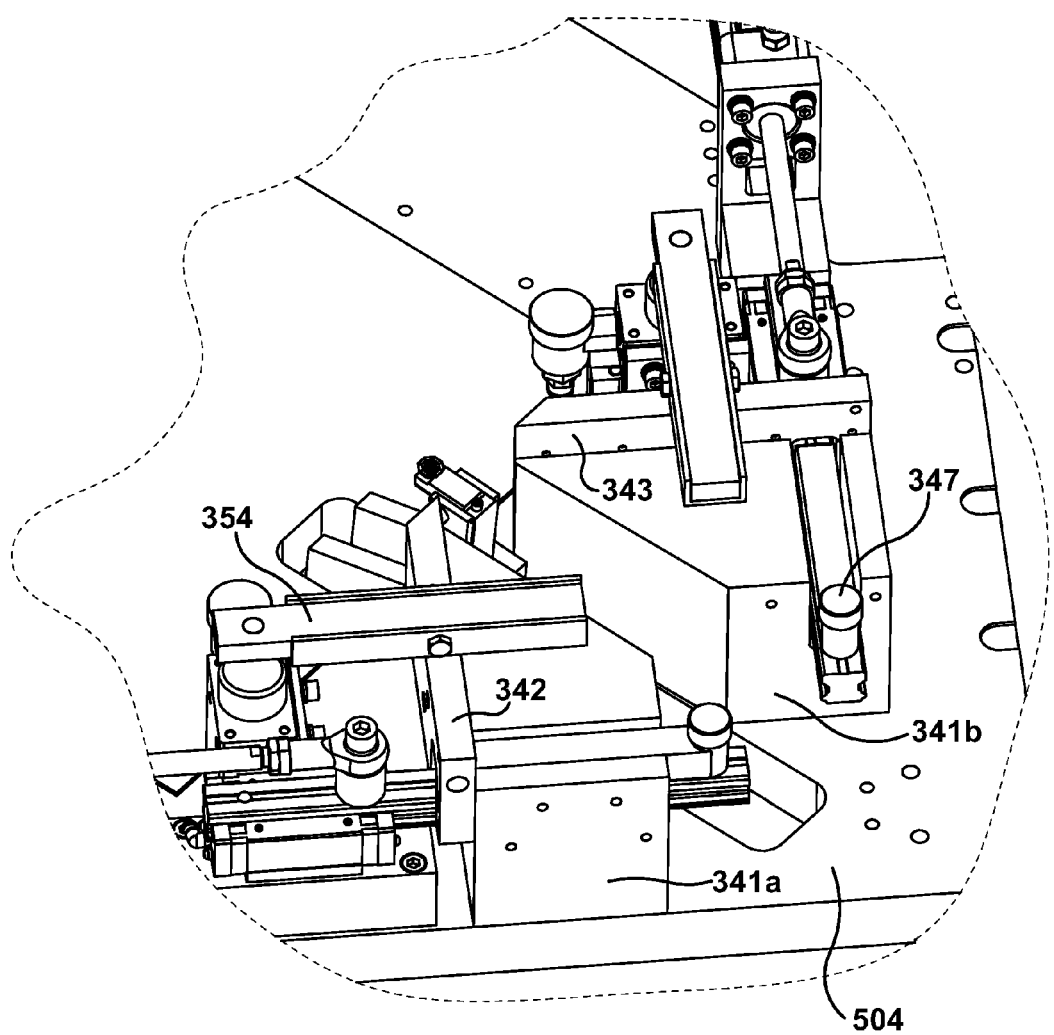
FIG. 21 is a perspective view on an enlarged scale showing an abrading knife for cleaning an under surface of a frame or sash.

FIGS. 17, 21 and 22 depict a knife 394 used to abrade a bottom surface 112 (for example) of a frame or sash positioned at the cleaning station 300. This knife is replaceable as are the other tools. The position of the knife in the x direction is controlled by a separate independently actuated air cylinder which moves a knife support 396 causing the cutting edge of the knife to scrape across a bottom surface 112 of the frame 110 from the inside to the outside of the frame.

The knife 394 (FIG. 22A) comprises a carbide cutter that has eight cleaning surfaces 395 so that as the knife wears a different one of these eight surfaces can be chosen to abrade the bottom corner surface of the frame or sash. FIG. 22 shows a blade assembly 500 that supports the knife 394.

The assembly 500 includes an air cylinder 502 attached to a base plate 504 shown in FIG. 21. The cylinder output is coupled through an alignment coupler 506 to a plate 508 which moves back and forth on rails 510, 512 coupled to the base plate 508 by bearings 514. The plate 508 is connected to the support 396 so that movement back and forth in the x direction causes the knife to move across and abrade the frame or sash. In the exemplary embodiment, this movement constitutes a full range of travel of the cylinder 502 but could be accomplished with a drive whose position is controlled in smaller increments.

The knife support 396 includes a notch 524 in its bottom surface that mates with a front portion of the plate to position the knife 394 in the x direction. A vertically extending column 520 fits into a slot 521 of the support 396 and supports a removable knife plate 522 on its top. The knife 394 has eight knife cutting surfaces 395 as depicted in FIG. 22A. In use, the knife is attached to the knife plate by threading a connector into the plate 522 through an opening 530 in the knife 394. To allow the knife blade cutting surface to be re-oriented, the connector is loosened and a different one of the eight surfaces oriented into position for cutting. To prevent the knife from rotating in use, the knife has surfaces 532 that abut a notch in the plate 522.

An up and down position (y) of the knife is accomplished by a threaded bolt 526 that passes through a bottom of the support 396. An end of this bolt contacts the column and by rotating the bolt the column 520 is raised and lowered. A post 528 that extends through the column rides in an interior slot of the support 396 to accommodate this up and down movement. The exemplary knife is commercially available from Seco and although the exemplary knife has eight cutting surfaces other configuration knives could be utilized.

Sensor Movement

In a preferred embodiment, the sensor S is a laser sensor 398 such as model number ILD 1700-200 Micro Epsilon Laser optical displacement sensor mounted at one end of a tool block of each cleaning head. As the controller moves the sensor, it emits light which bounces off a target region of the frame. In the cleaning station 300, the two heads 312, 314 have a sensor S that is mounted to the tool block 362 and moved into position above the frame by the air cylinder 376. Once in position, proper x and y actuation of the support assembly 330 by energization of the servos 329, 370 causes the sensor to move in precise increments along a controlled path. As seen in FIG. 5, one sensor sequence of movements with respect to the frame 110 causes the sensor beam to follow generally linear paths 151, 152, 153. The movements along the paths 151, 153 are achieved through controlled actuation of the servo 329 and an air cylinder 397.

A side shift along the path 152 is achieved by actuation of a cylinder drive 397 coupled to a support plate 399 to which the sensor 398 is mounted. The extent of this direction shift is typically ¼ to ¾ inches but could be more or less than this range.

The cleaning stations constructed in accordance with the various alternative embodiments operate in different cleaning modes as outlined in tables 1, 2 and 3.

TABLE 1

| Machine Mode | 1 | Manual |
|---|---|---|
| | 2 | Semi_Auto (single step) |
| | 3 | Auto |

During set up of the cleaning station, representative frames or sashes are placed into the station between the two heads and an operator forms a profile of the region of the sash to be cleaned by moving an appropriate tool into contact with the frame at spaced locations along a travel path and capturing the position of (x and y co-ordinates) of the tool. As the operator moves the tool using either a joystick or a touch screen on the monitor, the path of movement is displayed on a region 430 of the viewing or user monitor (see FIG. 18) depicted in the screen shot 412. This viewing set up procedure is performed in manual mode and allows programming of the tool to follow a proper cleaning sequence during production. The graphical depiction illustrates multiple cleaning paths 432 followed by an appropriate tool next to a profile of the particular frame that has been identified either automatically or entered by the operator. Another region 434 of the screen shot 412 lists start and end co-ordinates (x1, y1=start, x2, y2=end) in relation to a coordinate origin of the movements depicted on the screen as well as characteristics of the tool movement.

In semi-automatic mode, the cleaning head moves a tool along a path to clean one surface at a time and then stops and awaits user retraction. The user activates the next cleaning step and an appropriate tool moves into place and follows a next prescribed path. This mode is used for example to evaluate the effectiveness of a cleaning regimen for a particular frame profile.

In Automatic mode, the frame or sash 110 is placed on the support rests 340, 341 and the operator activates the cleaning process so that each head proceeds to clean its associated corner without operator intervention. Once the two corners have been cleaned, the controller unclamps the frame or sash and the user manually removes it and either retrieve another frame or reorient the just cleaned frame for insertion back into the station for cleaning of two additional corners.

TABLE 2

| Program Mode | 0 | Continuous |
|---|---|---|
| | 1 | Alternating |
| | 2 | Short mode, continuous, single head |
| | 3 | Short mode, alternating (auto side switching), single head |
| | 4 | Short mode, continuous, dual head |
| | 5 | Short mode, alternating, dual head |

In the continuous or batch mode of operation, the cleaning head processes the same two corners of the frame or sash on each item frame moved to the cleaning station. In an alternating mode, the operator places the frame or sash for cleaning, activates the cleaning of two corners, withdraws the frame or sash and then re-orients that frame or sash for immediate reinsertion into the station for cleaning the frame's additional two corners.

For most of the commonly encountered window components, the two cleaning heads operate simultaneously. However, for items having too short a side dimension only one head can be in operation at a time. In the exemplary embodiment a minimum spacing between frame corners is 22 inches. In a short mode, only one corner of the frame or sash is being cleaned at any time. This is the so called short mode of machine operation. As an example, in mode 2 (table 2), a single head is used for cleaning and the same corner is repeatedly cleaned one after another of a given type of frame. In mode 5, both heads are used, that is after one corner is cleaned another corner is moved for clamping at the spaced apart head. Furthermore, in this alternating mode, the frame or sash is reoriented and again placed into the cleaning station so that all four corners are cleaned before another frame is cleaned.

TABLE 3

| Run Mode | | |
|---|---|---|
| 0 | No recognition/compensation (manual) |
| 1 | Clamp recognition |
| 2 | Laser recognition |
| 3 | Clamp and laser recognition |
| 4 | Laser compensation |
| 5 | Compensation + clamp recognition |
| 6 | Compensation + laser recognition |
| 7 | Compensation + Clamp and Laser recognition |
| 8 | Compensation & Recognition at the same time (laser + clamp recognition |
| 9 | Reserved for compensation & recognition at the same time (laser only) |
| 10 | Recognition Teach Mode |
| 11 | Compensation Teach Mode |
| 12 | Recognition and Compensation Teach Mode |

Table 3 lists different types of cleaning modes. Clamp recognition refers to determining a frame or sash profile based upon a position of the cams 347 brought into contact with the frame's inner surface. The sensor 357 monitors the position of an internal piston of the drive cylinder 352 and provides an analog output proportional to the extension of the cylinder's piston. When the cam 347 engages the frame the controller knows the contact position and hence information regarding the frame profile.

Listing 1

Figure 18:
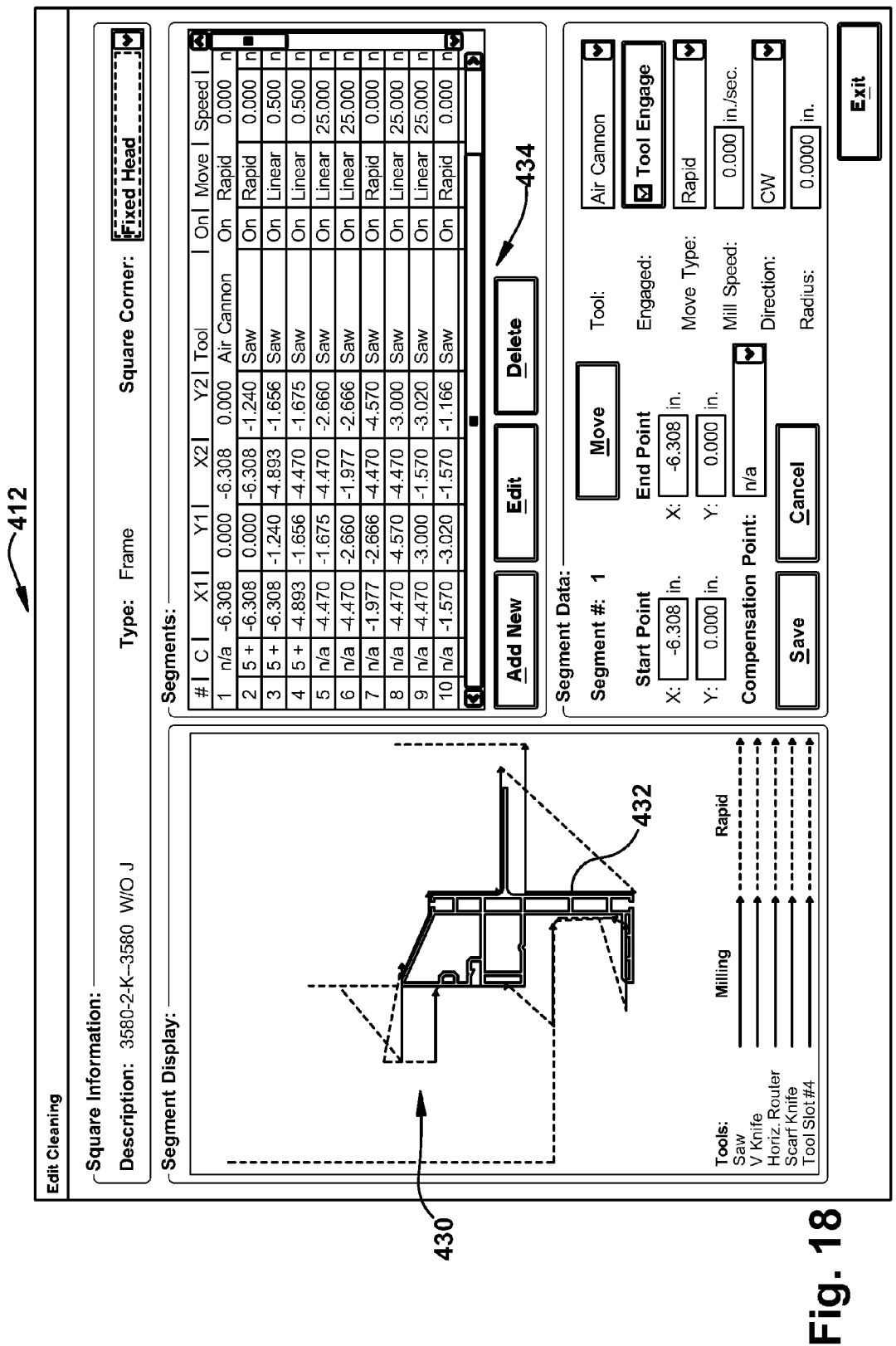
FIGS. 18 and 19 are visual depictions of a graphical user interfaces of a controller monitor used in setting up and operating the cleaning station.
Figure 19:
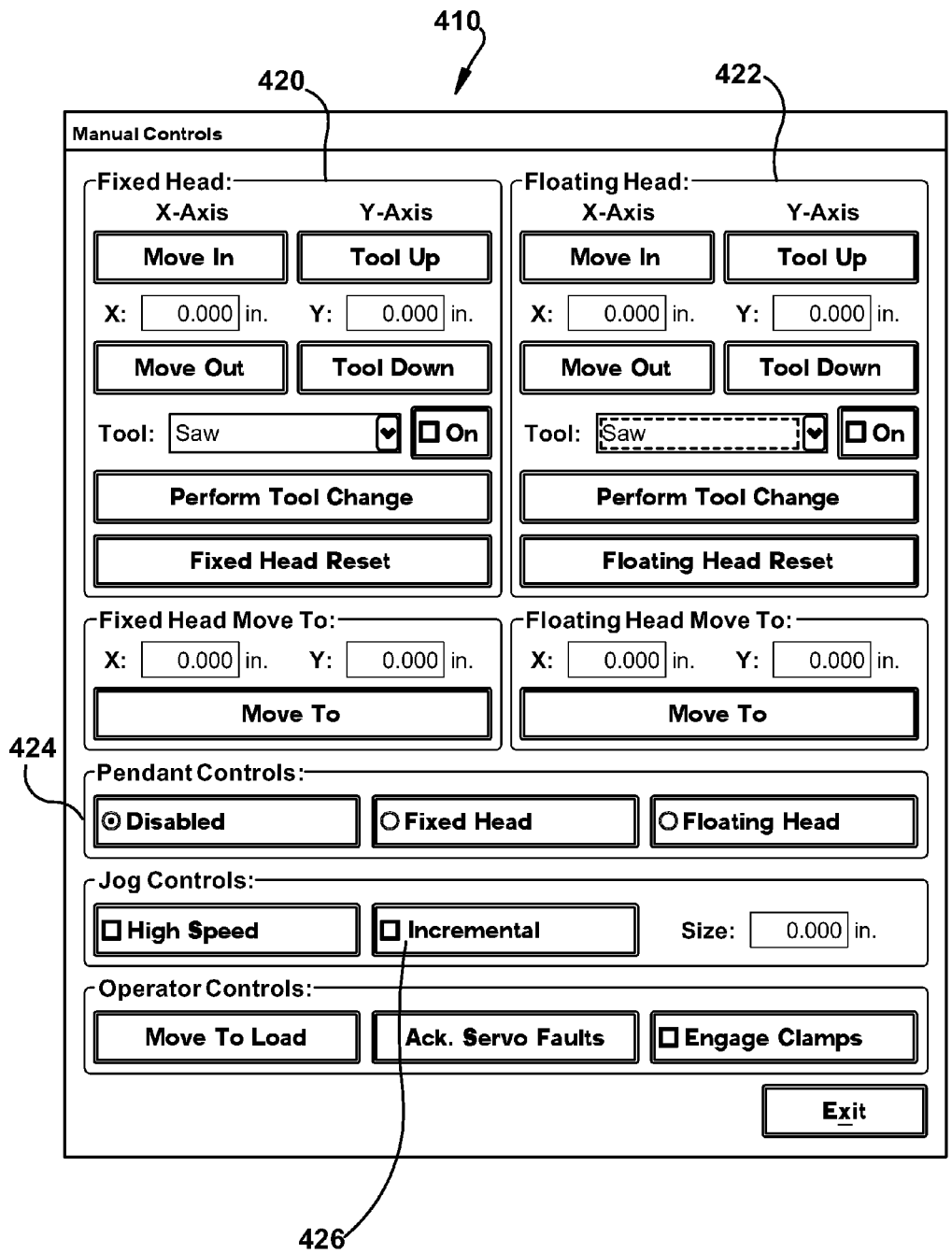
Figure 20A:
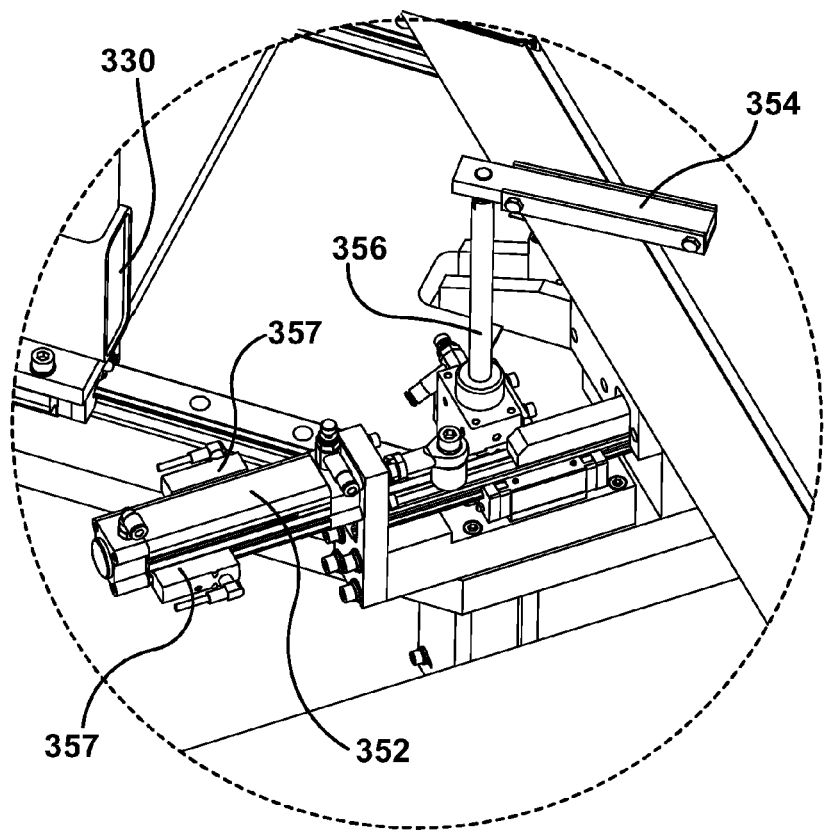
FIGS. 20A and 20B depict on an enlarged scale clamp arrangements.
Figure 20B:
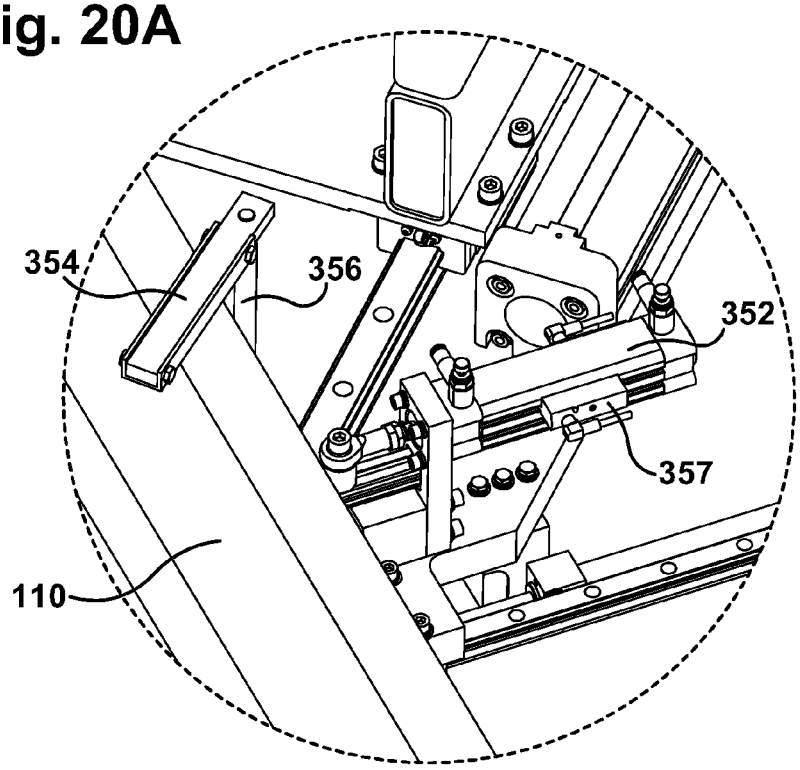

Start;
Initialize servos
Move to load position
Ready to load Frame
Loading Frame
Frame Loaded, ready to run
Based on runmode, get data
Load selected program, using identified profile
Run Routine The user interface screen shots of FIGS. 18 and 19 are used for programming a sequence of moves of one or more tools during cleaning of a corner region and initiating the sequence of moves in response to a recognition of a profile by the sensor. In FIG. 19 the fixed and moveable heads 312, 314 have separate control regions 420, 422 of the touch screen for moving tools mounted to those heads in controlled paths by touching the screen. A pull down menu allows the user to select a tool and then jog that position along controlled paths by touching the screen. A so called pendant control is enabled or disabled by a button 424 which allows one, both or neither of the heads to be moved with a joystick controller that communicates inputs to the controller 35. The user interface provides a mechanism for choosing a particular tool and moving the chosen tool a specified amount with respect to a corner region of the frame.

A real time cleaning program is implemented by monitoring a profile with a sensor and as the sensor follows a travel path in relation to the frame or sash causing 110 a cleaning tool such as the saw to follow the sensor and clean a surface of the frame or sash in real time.

Listing 2

Cleaning program selected
Program started
Bottom of frame cleaned
Inside/outside of frame cleaned
Top of frame cleaning program started
    Laser is moved outside the frame to a home
    Cleaning tool or saw is chosen for cleaning top of frame
    Head is moved toward the frame in the x-axis
    Laser starts detecting the frame, so the controller starts recording coordinates
    The head will continue to move in the x direction across the frame
    Before the tool/saw reaches the frame, the head will be positioned in the y direction
    The y axis position of the tool will be calculated based on the laser readings and position offsets between the laser and the tool/saw
    The head continues to move across the frame in the x direction at a constant rate
    The y-axis position at this stage is following the collected laser data such that the tool/saw is following the contour of the frame or sash
    The cleaning head is moved at a constant rate in the x direction while in the y direction the tool is moving up and down to allow the tool to track the profile of the frame or sash
    The controller compensates for x and y position offsets between the laser sensor that is collecting frame/sash data and the tool/saw that is cleaning in close proximity the frame/sash in real time.

The disclosed window processing system has been described with a degree of particularity but it is the intent that the invention include all modifications from the disclosed design falling within the spirit or scope of the appended claims.

The invention claimed is:

1. A window processing system for use in fabricating window frames or sashes comprising:
    a) a cleaning station comprising a knife blade body having multiple cutting surfaces moveable relative to selected portions of a window frame or sash positioned at the cleaning station for removing flash from the frame or sash;
    b) a support for the knife blade body having a notch into which a corresponding surface of the knife blade body seats in use to orient said knife blade body so that a selected one cutting surface amongst the multiple cutting surfaces is positioned for abrasive cleaning of the window frame or sash; and
    c) a drive for moving the support in relation to the frame or sash to bring the selected one cutting surface into contact with the frame or sash.

2. The apparatus of claim 1 wherein the drive comprises a controller for controlling movement of the knife blade body to clean specified one or more locations of the window frame or sash.

3. The apparatus of claim 2 wherein the knife blade body includes a support base having a plurality of edges that fit within the notch to orient the one cutting surface into a cutting orientation.

\* \* \* \* \*